United States Patent
Abner et al.

(10) Patent No.: US 9,346,231 B1
(45) Date of Patent: May 24, 2016

(54) WASTE COMPACTOR SYSTEM

(71) Applicant: MSW POWER CORPORATION, Acton, MA (US)

(72) Inventors: Joseph Abner, Middleboro, MA (US); Stephen Armstrong, Andover, MA (US); Steven Chase, Hanover, MA (US); David Rich, Upton, MA (US); Matthew Young, Westford, MA (US)

(73) Assignee: MSW Power Corporation, Acton, MA (US)

( * ) Notice: Subject to any disclaimer, the term of this patent is extended or adjusted under 35 U.S.C. 154(b) by 0 days.

(21) Appl. No.: 14/868,935

(22) Filed: Sep. 29, 2015

Related U.S. Application Data

(63) Continuation-in-part of application No. 14/614,812, filed on Feb. 5, 2015, now Pat. No. 9,174,406.

(51) Int. Cl.
  B30B 9/04 (2006.01)
  B30B 9/30 (2006.01)
  (Continued)

(52) U.S. Cl.
  CPC ............ B30B 9/3042 (2013.01); B01D 29/66 (2013.01); B30B 9/04 (2013.01); B30B 9/06 (2013.01); B30B 9/3039 (2013.01); B30B 9/3057 (2013.01)

(58) Field of Classification Search
  CPC ............ B30B 9/02; B30B 9/04; B30B 9/047; B30B 9/06; B30B 9/062; B30B 9/3039; B30B 9/3057; B30B 9/3059; B30B 9/3014; B30B 9/3042

USPC ............ 100/43, 45, 104, 110, 112, 116, 126, 100/127, 130, 131, 229 R, 240, 245
See application file for complete search history.

(56) References Cited

U.S. PATENT DOCUMENTS

| | | | |
|---|---|---|---|
| 2,002,993 | A | 5/1935 | Ehrick et al. |
| 2,109,559 | A | 3/1938 | Wickert, Jr. |

(Continued)

FOREIGN PATENT DOCUMENTS

| | | |
|---|---|---|
| CN | 203094909 | 7/2013 |
| CN | 203486425 | 3/2014 |

(Continued)

OTHER PUBLICATIONS

Sebright Products, Inc.—"Speciality Compaction Equipment", pp. 1-5.

(Continued)

*Primary Examiner* — Jimmy T Nguyen
(74) *Attorney, Agent, or Firm* — Occhiuti & Rohlicek LLP

(57) ABSTRACT

A waste compactor to compact waste for disposal in a waste container includes a compaction chamber for receiving waste to be compacted and a closure assembly configured to seal a first opening during a compaction mode. There is a ram assembly in the compaction chamber and an actuator to move the ram assembly from a retracted position toward an extended position which compacts the waste against the closure assembly. There is a plurality of apertures in an internal surface of the compaction chamber where liquid and residual solid waste exit through the apertures during the compaction mode. There is a collection system to collect liquid and residual solid waste, which includes a filter unit. The filter unit has a first end and a second end, the second end includes an opening in communication with the compaction chamber. And, there is an evaporation system to evaporate the liquid.

22 Claims, 23 Drawing Sheets

(51) Int. Cl.
  *B01D 29/66* (2006.01)
  *B30B 9/06* (2006.01)

(56) References Cited

U.S. PATENT DOCUMENTS

| | | |
|---|---|---|
| 3,789,752 A | 2/1974 | Wirz |
| 3,861,117 A | 1/1975 | DeFilippi |
| 4,158,332 A * | 6/1979 | Melandri ............... B30B 9/062 100/116 |
| 4,387,633 A | 6/1983 | Ballantyne |
| 4,467,715 A | 8/1984 | Bunger |
| 4,627,365 A | 12/1986 | Tseng |
| 4,646,633 A * | 3/1987 | Falguieres ............ B30B 9/062 100/116 |
| 4,706,560 A | 11/1987 | Capodicasa |
| 5,020,321 A | 6/1991 | Lord |
| 5,146,848 A * | 9/1992 | Dufour .................. B30B 9/67 100/110 |
| 5,178,062 A | 1/1993 | Spiers |
| 5,207,994 A | 5/1993 | Suzuki et al. |
| 5,215,007 A | 6/1993 | Sebright et al. |
| 5,325,771 A * | 7/1994 | Morris ................. B30B 9/3039 100/126 |
| 5,400,726 A * | 3/1995 | Dumons ................ B03B 9/06 100/102 |
| 5,762,758 A | 6/1998 | Hoffman |
| 5,887,516 A | 3/1999 | Sebright et al. |
| 6,298,576 B1 | 10/2001 | La Gioia |
| 6,684,764 B2 | 2/2004 | Sebright et al. |
| 6,945,180 B1 | 9/2005 | Khymych |
| 7,272,895 B2 | 9/2007 | La Gioia |
| 7,383,766 B2 * | 6/2008 | McIntosh ................ C10L 9/08 100/116 |
| 7,722,739 B2 | 5/2010 | Haslem et al. |
| 2005/0098049 A1 | 5/2005 | Shepard |
| 2010/0287896 A1 | 11/2010 | Terra |
| 2010/0293846 A1 | 11/2010 | Shaffer |
| 2011/0259210 A1 | 10/2011 | Reed et al. |
| 2012/0145012 A1 | 6/2012 | Koenig et al. |
| 2013/0160662 A1 | 6/2013 | Correale, Jr. |
| 2013/0326938 A1 | 12/2013 | French et al. |

FOREIGN PATENT DOCUMENTS

| | | |
|---|---|---|
| DE | 4117420 | 12/1992 |
| WO | PCT/US2004/018290 | 3/2005 |

OTHER PUBLICATIONS

Sebrigth Products, Inc. Engineered Right, Built Right, Installed Right, Serviced Right—by Sebright—Super Heavy Weight Compactors, pp. 1-2.
Sebright Products, Inc.—High Density Extruders—pp. 1-4.
Environmental Solutions Group, RJ-30 High-Density Compactor Extruder, pp. 1-2.

\* cited by examiner

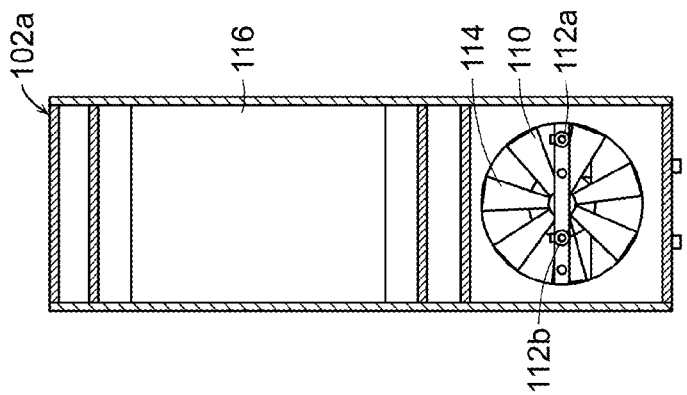
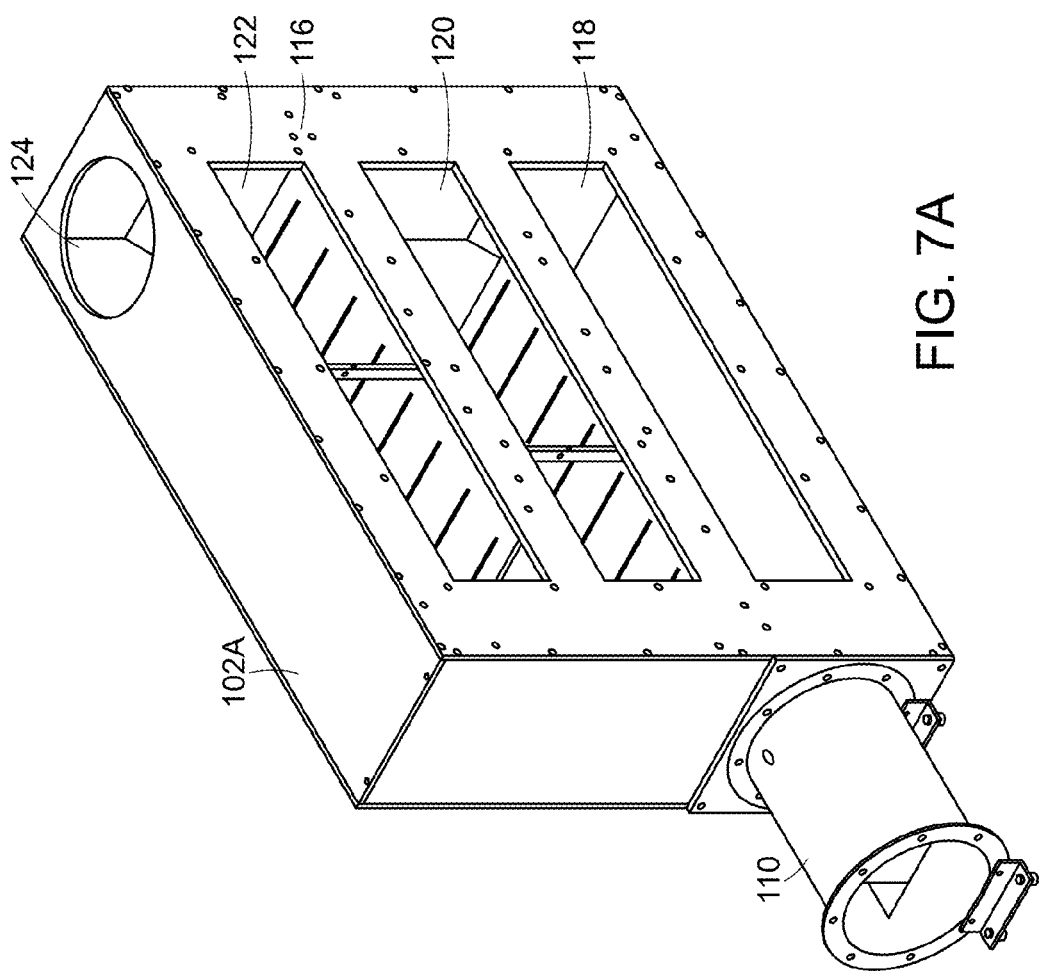

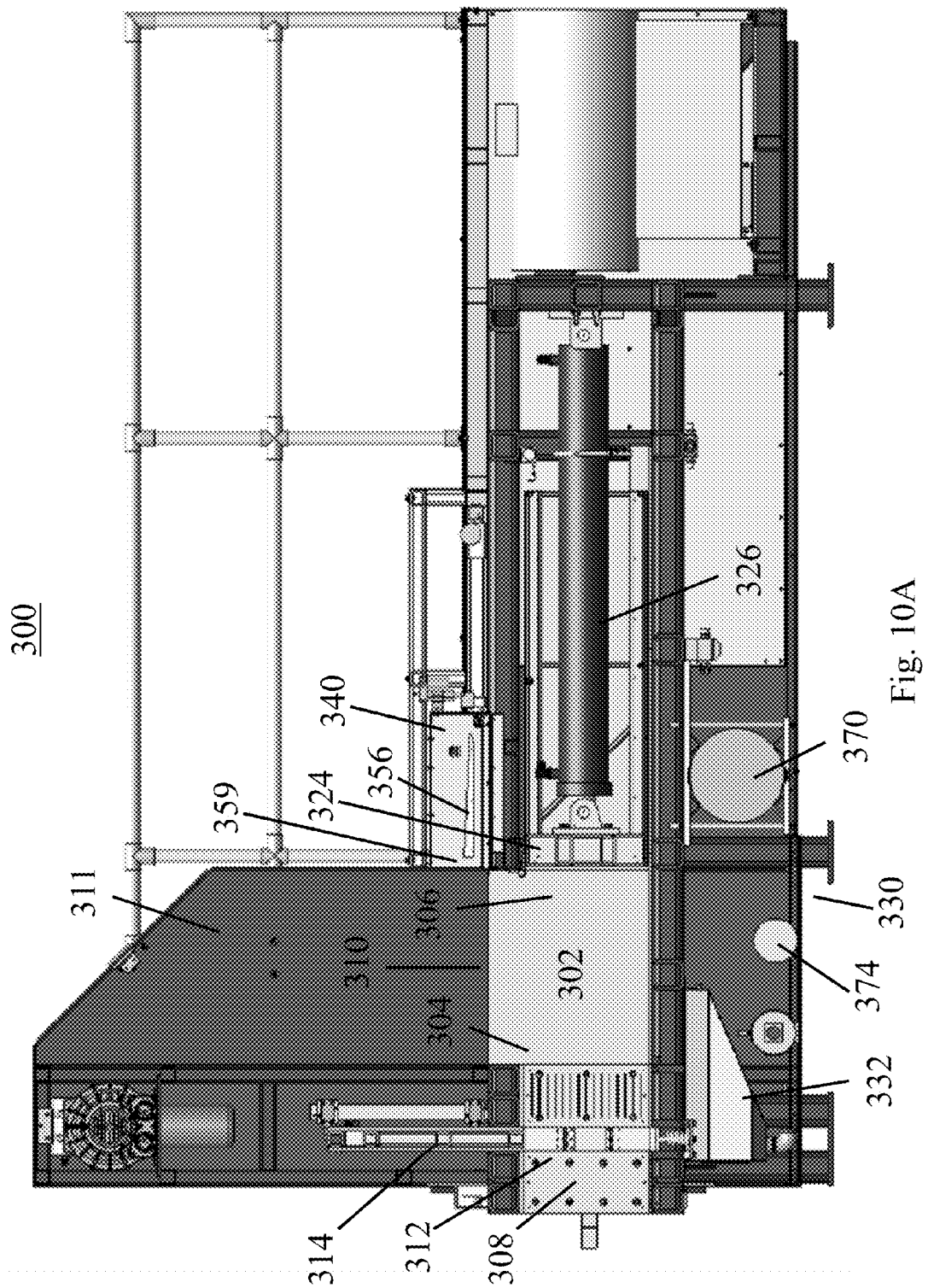

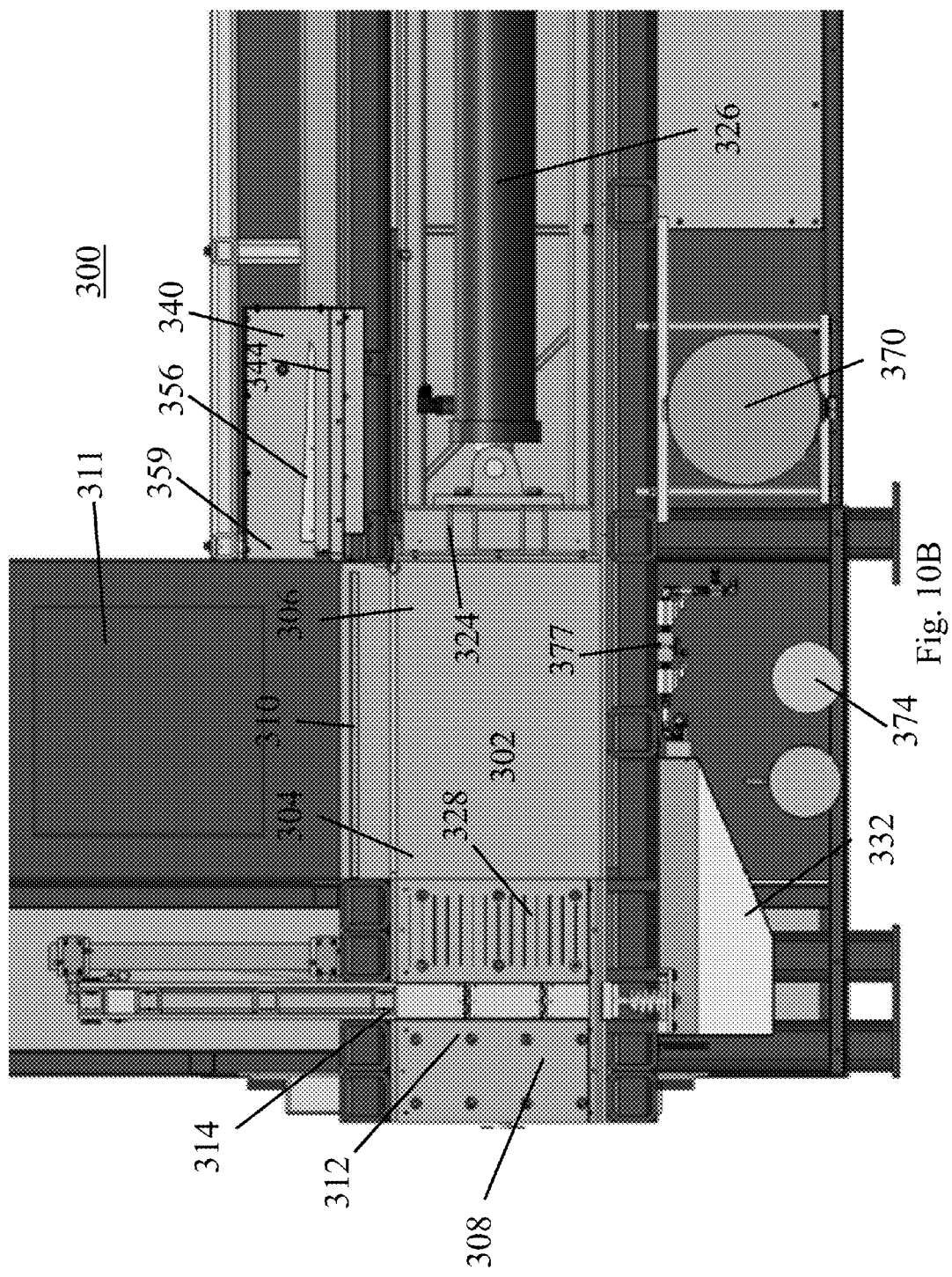

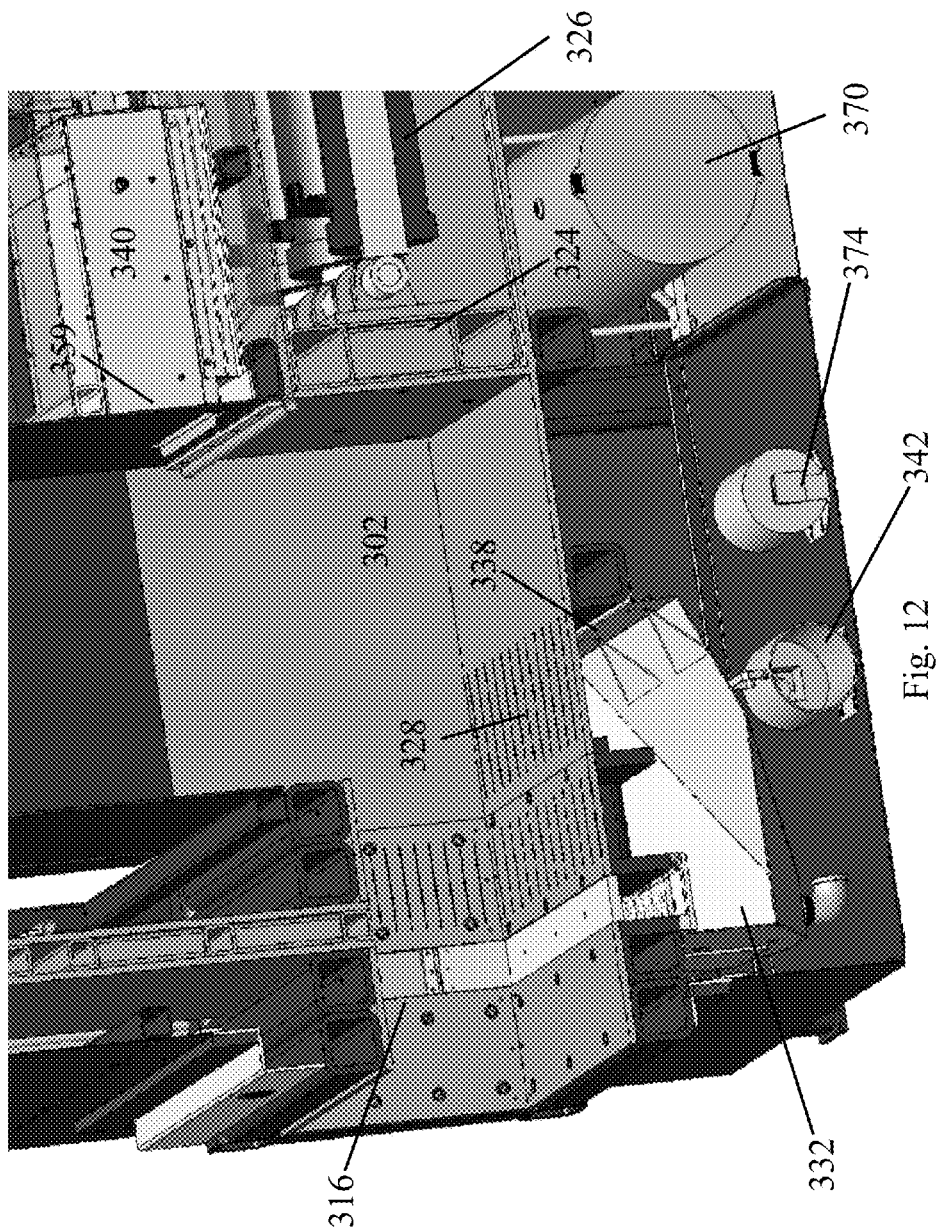

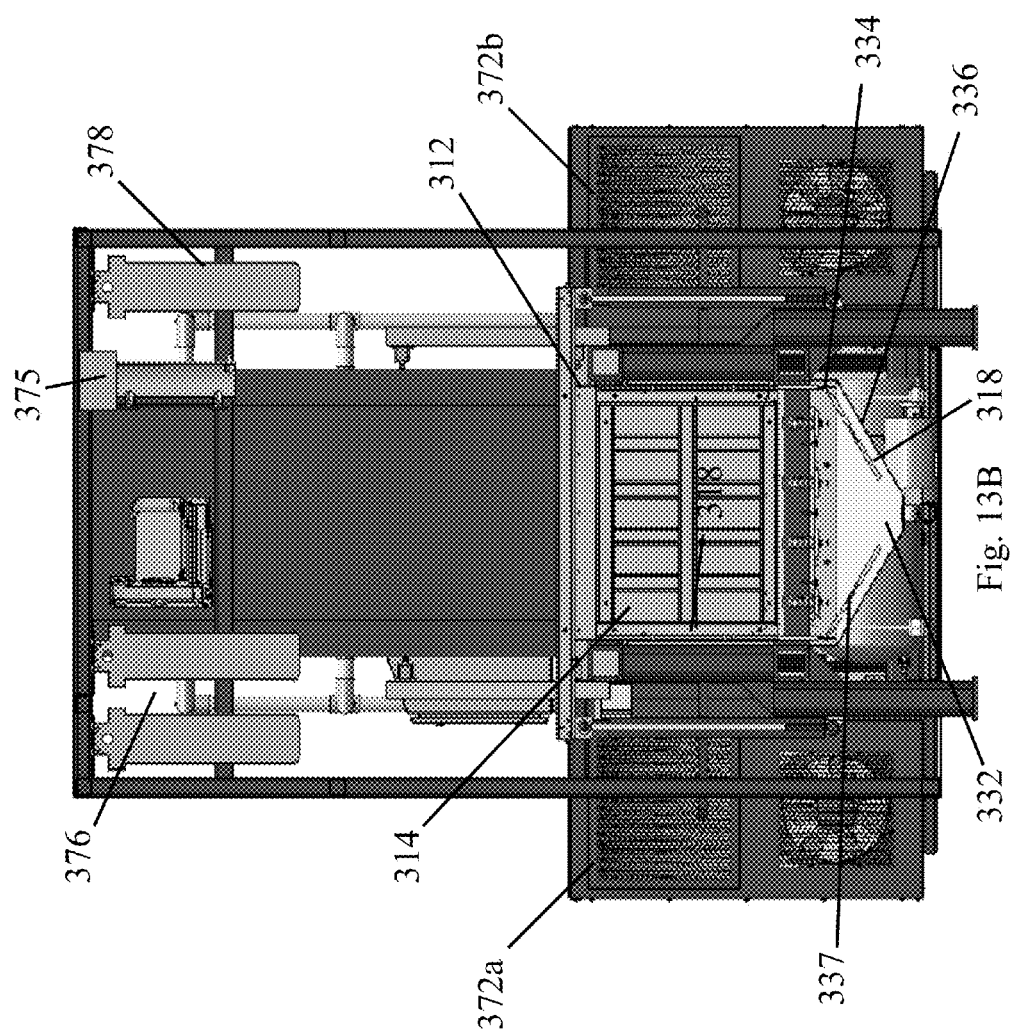

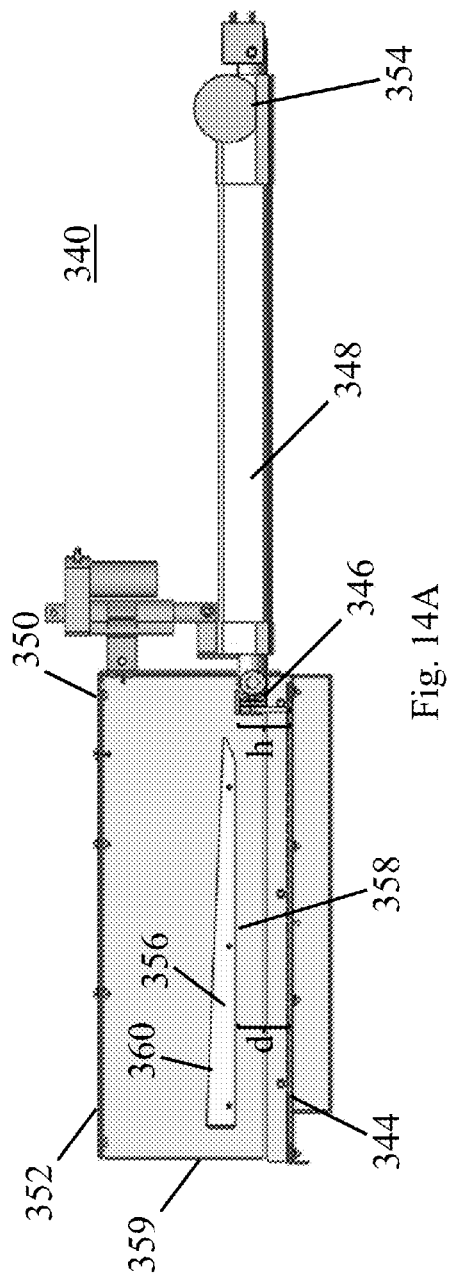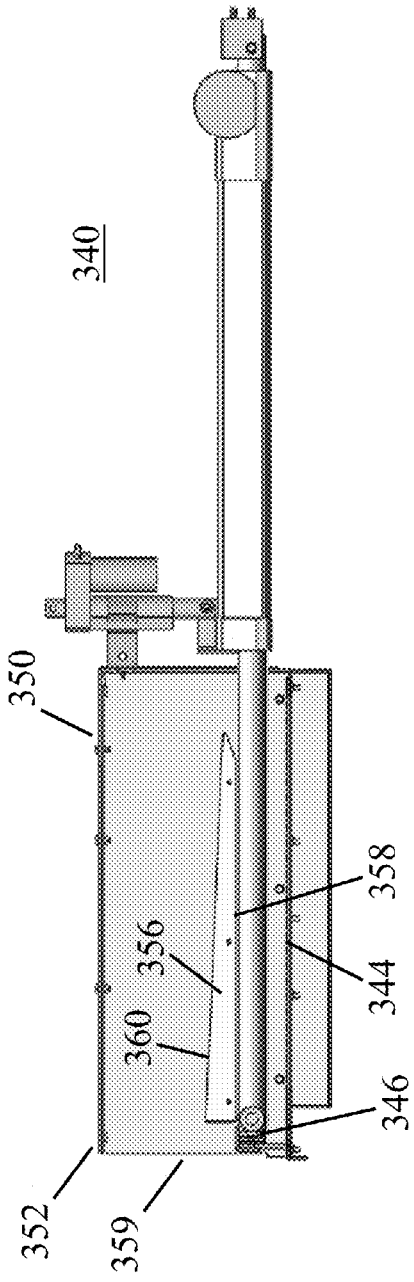
Fig. 14A
Fig. 14B

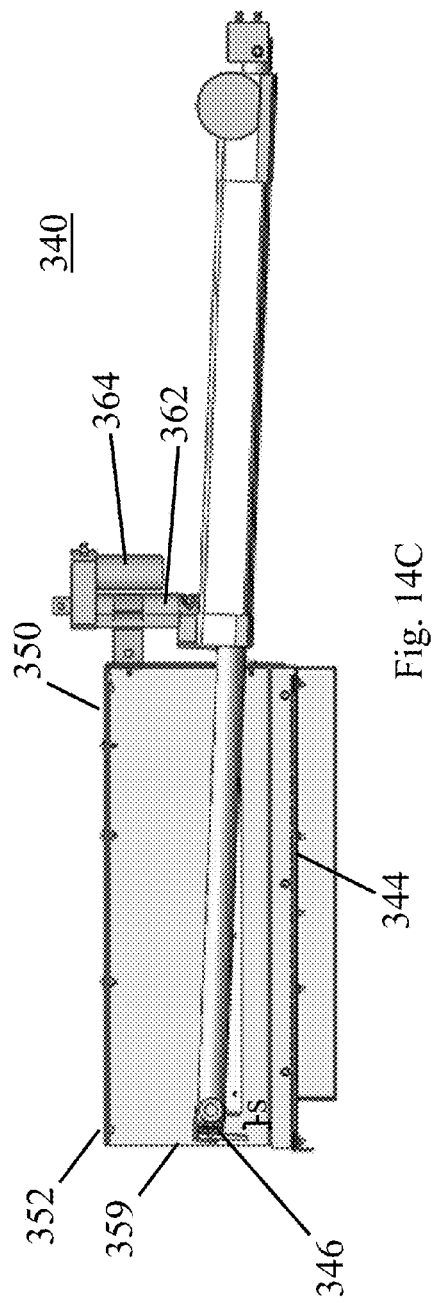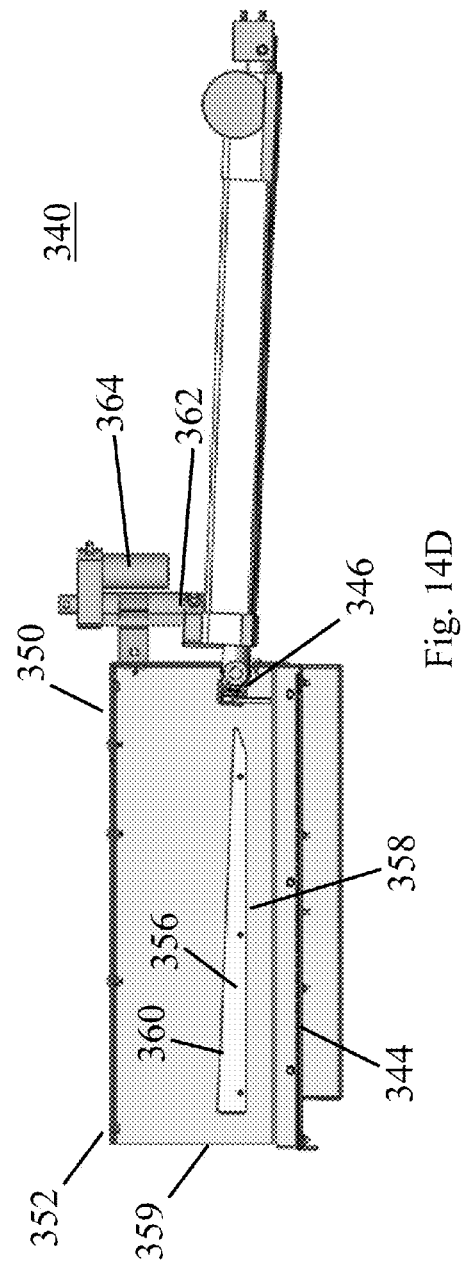

WASTE COMPACTOR SYSTEM

CROSS-REFERENCE TO RELATED PATENT APPLICATIONS

This application is a continuation in part of U.S. application Ser. No. 14/614,812 filed on Feb. 5, 2015, now U.S. Pat. No. 9,174,406, the contents of which are hereby incorporated by reference in their entirety.

FIELD OF INVENTION

The present invention relates to a waste compactor system and more specifically to a waste compactor system directed to substantially reducing the weight and volume of the compacted waste in order to minimize waste removal and disposal costs.

BACKGROUND

Compactors used for compacting waste have been well known for many years. These compactors utilize a hydraulic ram positioned in a chamber to compact the waste into a denser form. The hydraulic ram compacts the waste against a solid surface within the chamber. In addition to compacting the solid material, a portion of the liquid contained in the waste material may be extracted from the solid waste when pressure is applied by the hydraulic ram. The extracted liquid is discharged from the chamber via drainage slots, grates or holes located in the chamber. Self-contained compactors are typically used for the storage and removal of solid waste containing liquid waste. By regulation, these compactors are designed so that the compactor is attached to a waste container for storage of the compacted waste and the entire system is hauled to the waste disposal site. This eliminates any cross-contamination between the liquid waste and the environment while disposing of the waste. During the compaction process, waste is reduced in volume by removing the air voids located within the waste bulk. A typical compaction ratio of the waste achieved is 3:1.

The compaction of waste is economically advantageous because it significantly reduces the cost of waste disposal for large producers of waste, such as supermarkets, malls, large restaurants, hotels, hospitals and institutions. However, the costs are still significant. One cost associated with waste disposal is the tipping fee, which is based on the number of instances a waste hauler needs to empty a waste container. This cost may be reduced using a compaction process as it allows for more waste to be stored in a waste container, thereby reducing the number of times a waste hauler needs to empty the waste unit. Another cost is the disposal fee, which is based on the overall weight of the waste stored in the waste container. This cost can be minimized by removing liquid from the waste, thereby reducing the disposal weight.

However, the liquid removed from the waste must be disposed of as well. Liquid waste is typically removed from the compaction chamber either via a pumping mechanism or gravimetrically. The liquid waste is maintained in a separate vessel to be disposed by maintenance personnel or a third party vendor off-site. Disposing of this extracted liquid waste off-site induces further costs however these costs are still substantially less than the fees associated with maintaining the liquid waste within the solid waste. Further issues that arise with extracting the liquid waste during compaction and later disposing of the liquid waste off-site include the requirement of additional footprint for liquid waste storage on-site and the logistics for the solid waste generator to store the liquid waste.

Certain waste compactor systems have incorporated liquid evaporation in order to dispose of the liquid waste on-site after being extracted from the solid waste during compaction. These systems address, to some extent, the issues described above. However, the evaporation techniques utilized in the aforementioned compaction systems are limiting because either they fail to substantially dispose of all the extracted waste liquid, they rely solely on electrically powered heating elements which require a significant amount of energy, or they vaporize the liquid waste by heating the liquid beyond its boiling point. Furthermore, in some instances, the evaporation is performed within the compaction chamber which is not suitable for treating industrial and municipal solid waste containing plastics or other waste with a comparable melting point. Therefore, prior art compactor systems do not provide an overall cost effective and energy efficient solution for waste disposal.

SUMMARY

In one aspect, the invention features a waste compactor configured to compact waste into a plurality of compacted waste units for disposal in a waste container. There is a compaction chamber for receiving waste to be compacted, including a first end and a second end, the first end having a first opening for interfacing with the waste container; the compaction chamber further including a second opening for inserting waste to be compacted. There is a closure assembly configured to seal the first opening during a compaction mode and a ram assembly disposed within the compaction chamber and actuatable from a retracted position proximate the second end of the compaction chamber to an extended position proximate the first end. There is an actuator interconnected to the ram assembly configured, during the compaction mode, to apply a force to the ram assembly to move the ram assembly from the retracted position toward the extended position to achieve a pressure on a compaction surface of the ram assembly as it compacts the waste against the closure assembly. There is a plurality of apertures in at least one internal surface proximate the first end of the compaction chamber; wherein liquid and residual solid waste exit the compaction chamber through the apertures during the compaction mode. There is a collection system configured to collect the liquid and residual solid waste from the plurality of apertures. The collection system includes a filter unit configured to filter the liquid and retain residual solid waste and the filter unit has a first end and a second end. The second end includes an opening in communication with the compaction chamber and the collection system further includes an evaporation system to evaporate at least a portion of the liquid filtered by the filter unit.

In other aspects of the invention, one or more of the following features may be included. The collection system may include a collection chamber, configured to receive the liquid and residual solid waste from the plurality of apertures. The collection system may further include a first line for transporting the liquid and residual solid waste from the collection chamber to the filter unit. The collection system may further include a pump to transport the liquid and residual solid waste from the collection chamber to the filter unit. The collection chamber may further include at least one nozzle, configured to spray the internal surfaces of the collection chamber in a cleaning mode. The filter unit may include a filter, positioned between the first end and the second end of the filter unit, through which the liquid passes, the residual solid waste remaining on a surface of the filter. The filter unit may further include a scraper device configured to travel in an extension mode from the first end to the second end across the surface of the filter to remove the residual solid waste from the filter and force the residual solid waste out of the opening of the second end and into the compaction chamber and to travel in a retraction mode from the second end to the first end. The filter unit may include a first actuator interconnected to the scraper device and configured to extend the scraper device in the extension mode from a retracted position proximate the first end to an extended position to cause the scraper device to remove the residual solid waste from the filter and force it out of the opening of the filter unit and configured to retract the scraper device in the retraction mode from the extended position proximate the second end to the retracted position. The filter unit may further include a pair of guide members each having a top and a bottom surface, the guide members being disposed on opposite sides of the surface of the filter and extending from proximate the first end to proximate the second end of the filter unit, the scraper device traveling under the bottom surfaces of the guide members as the scraper device moves from the retracted position to the extended position in the extension mode to maintain contact between the scraper device and the filter and the scraper device being in contact with the top surfaces of the guide members as the scraper device moves from the extended position to the retracted position in the retraction mode to maintain separation between the scraper device and the filter. The filter unit may further include a second actuator configured to move the scraper device away from the surface of the filter and position the scraper device on the top surfaces of the guide members as the scraper device moves from the extended to the retracted position in the retraction mode to maintain separation between the scraper device and the surface of the filter. The bottom surfaces of the guide members may be positioned a distance less than or equal to a height of the scraper device from the surface of the filter to provide a downward force from the scraper device on the surface of the filter as the scraper device travels in an extension mode from the first end to the second end across the filter.

In yet other aspects of the invention, one or more of the following features may be included. The plurality of apertures may have a width ranging from ¼ inch to 1/32 inch. The filter may comprise a filter material having a plurality of openings with a width ranging from 0.01 inch to 0.05 inch. The filter may further comprise a perforated plate to support the filter material. The closure assembly may include a gate having two vertical sides, the gate moveable in a vertical direction to alternatively open to expose the first opening and close to seal the first opening, wherein the closure assembly further includes two vertical channels in which the two vertical sides of the gate travel as the gate is opened and closed. The closure assembly may further include a filling member affixed to the bottom of each vertical side of the gate, each filling member configured to fill its respective vertical channel as the gate is opened. The collection chamber may further include an aperture aligned with each of the filling members to receive the filling members as they travel into the collection chamber as the gate is closed. The collection chamber may include angled sidewalls and the filling members are hinged so as to conform to the angled sidewalls as the filling members travel into the collection chamber as the gate is closed. The filling members may be made of a polymer. The collection system may further comprise a liquid collection vessel, in communication with the filter unit, the liquid collection vessel configured to receive the liquid from the filter unit. There may be further included a second line for transporting the liquid between the liquid collection vessel and the evaporation system and a first filtration system disposed in the second line to remove particles from the liquid. There may also be included a pump to transport the liquid from the collection chamber to the evaporation system. The size of the particles removed by the first filtration system may range from 0.5 to 5 microns. There may further be included a second filtration system disposed in the second line to remove hydrocarbons and odor from the liquid, wherein the second filtration system comprises activated carbon.

In another aspect of the invention there is a waste compactor configured to compact waste into a plurality of compacted waste units for disposal in a waste container. There is a compaction chamber for receiving waste to be compacted, including a first end and a second end, the first end having a first opening for interfacing with the waste container; the compaction chamber further including a second opening for inserting waste to be compacted. There is a closure assembly configured to seal the first opening during a compaction mode, wherein the closure assembly includes a gate having two vertical sides. The gate is moveable in a vertical direction to alternatively open to expose the first opening and close to seal the first opening, wherein the closure assembly further includes two vertical channels in which the two vertical sides of the gate travel as the gate is opened and closed. The closure assembly further includes a filling member affixed to the bottom of each vertical side of the gate, each filling member configured to fill its respective vertical channel as the gate is opened. There is a ram assembly disposed within the compaction chamber and actuatable from a retracted position proximate the second end of the compaction chamber to an extended position proximate the first end. There is an actuator interconnected to the ram assembly configured, during the compaction mode, to apply a force to the ram assembly to move the ram assembly from the retracted position toward the extended position to achieve a pressure on a compaction surface of the ram assembly as it compacts the waste against the closure assembly. There is a plurality of apertures in at least one internal surface proximate the first end of the compaction chamber through which liquid removed from the waste during the compaction mode exits the compaction chamber. There is a collection system configured to collect the liquid and residual solid waste from the plurality of apertures; wherein the collection system further includes an evaporation system configured to evaporate at least a portion of the liquid.

In other aspects of the invention one or more of the following features may be included. The collection system may include a collection chamber, configured to receive the liquid and residual solid waste from the plurality of apertures, the collection chamber may further include an aperture aligned with each of the filling members to receive the filling members as they travel into the collection chamber as the gate is closed. The collection chamber may include angled sidewalls and the filling members may be hinged so as to conform to the angled sidewalls as the filling members travel into the collection chamber as the gate is closed. The filling members may be made of a polymer. The collection system may further include a first line for transporting the liquid and residual solid waste from the collection chamber to the filter unit. The collection system may further include a pump to transport the liquid and residual solid waste from the collection chamber to the filter unit. The collection chamber may further include at least one nozzle, configured to spray the internal surfaces of the collection chamber in a cleaning mode. The collection system may include a filter unit configured to filter the liquid and retain residual solid waste. The filter unit may have a first end and a second end, the second end including an opening in communication with the compaction chamber. The filter unit may include a filter, positioned between the first end and the second end of the filter unit, through which the liquid passes, the residual solid waste remaining on a surface of the filter. The filter unit may further include a scraper device configured to travel in an extension mode from the first end to the second end across the surface of the filter to remove the residual solid waste from the filter and force the residual solid waste out of the opening of the second end and into the compaction chamber and to travel in a retraction mode from the second end to the first end. The filter unit may include a first actuator interconnected to the scraper device and configured to extend the scraper device in the extension mode from a retracted position proximate the first end to an extended position to cause the scraper device to remove the residual solid waste from the filter and force it out of the opening of the filter unit and configured to retract the scraper device in the retraction mode from the extended position proximate the second end to the retracted position. The filter unit may further include a pair of guide members each having a top and a bottom surface, the guide members may be disposed on opposite sides of the surface of the filter and extending from proximate the first end to proximate the second end of the filter unit. The scraper device may travel under the bottom surfaces of the guide members as the scraper device moves from the retracted position to the extended position in the extension mode to maintain contact between the scraper device and the filter and the scraper device being in contact with the top surfaces of the guide members as the scraper device moves from the extended position to the retracted position in the retraction mode to maintain separation between the scraper device and the filter.

The filter unit may further include a second actuator configured to move the scraper device away from the surface of the filter and position the scraper device on the top surfaces of the guide members as the scraper device moves from the extended to the retracted position in the retraction mode to maintain separation between the scraper device and the surface of the filter. The bottom surfaces of the guide members may be positioned a distance less than or equal to a height of the scraper device from the surface of the filter to provide a downward force from the scraper device on the surface of the filter as the scraper device travels in an extension mode from the first end to the second end across the filter.

In yet other aspects of the invention, one or more of the following features may be included. The plurality of apertures may have a width ranging from ¼ inch to 1/32 inch. The filter may comprise a filter material having a plurality of openings with a width ranging from 0.01 inch to 0.05 inch. The filter may further comprise a perforated plate to support the filter material. There may further be a liquid collection vessel, in communication with the filter unit, the liquid collection vessel configured to receive the liquid from the filter unit. There may be a second line for transporting the liquid between the liquid collection vessel and the evaporation system and a first filtration system disposed in the second line to remove particles from the liquid. There may further be included a pump to transport the liquid from the collection chamber to the evaporation system. The size of the particles removed by the first filtration system may range from 0.5 to 5 micron. There may further be a second filtration system disposed in the second line to remove hydrocarbons and odor from the liquid, wherein the second filtration system comprises activated carbon.

An object of the invention is to reduce hauling and disposal costs by substantially reducing the weight and volume of the waste.

A further object of the invention is to provide a high pressure compaction system to substantially reduce the volume of waste produced and to extract a considerable amount of the liquid from the waste to substantially reduce the weight of the compacted waste.

A further object of the invention is to provide a waste compactor system with optimized compaction, liquid removal and energy efficiency.

A further object of the invention is to dispose of the extracted liquid on-site without the need for maintenance personnel or a vendor to dispose of the liquid and to do it in an energy efficient and environmentally friendly manner.

Additional objects and advantages of the invention will become apparent as the following description proceeds; and the features of novelty which characterize the invention will be pointed out with particularity in the claims annexed to and forming a part of this specification.

BRIEF DESCRIPTION OF THE DRAWINGS

FIG. 7A is a perspective view of the evaporation system of the waste compactor according to this invention;

FIG. 7B is a cross sectional view of the evaporation system of FIG. 7A;

FIGS. 10A-C are cross sectional views of an alternative embodiment of the waste compactor of the invention with the gate in the up position and the gate in the down position, respectively;

FIG. 12 is a perspective view of the waste compactor of FIG. 10 depicting the collection chamber in the cleaning mode;

FIGS. 13A-B are cross sectional views across the width of the waste compactor of FIG. 10 with the gate in the up position and the gate in the down position, respectively;

FIGS. 14A-D are cross sectional views of the filter unit of the waste compactor of FIG. 10;

DETAILED DESCRIPTION

Figure 1:
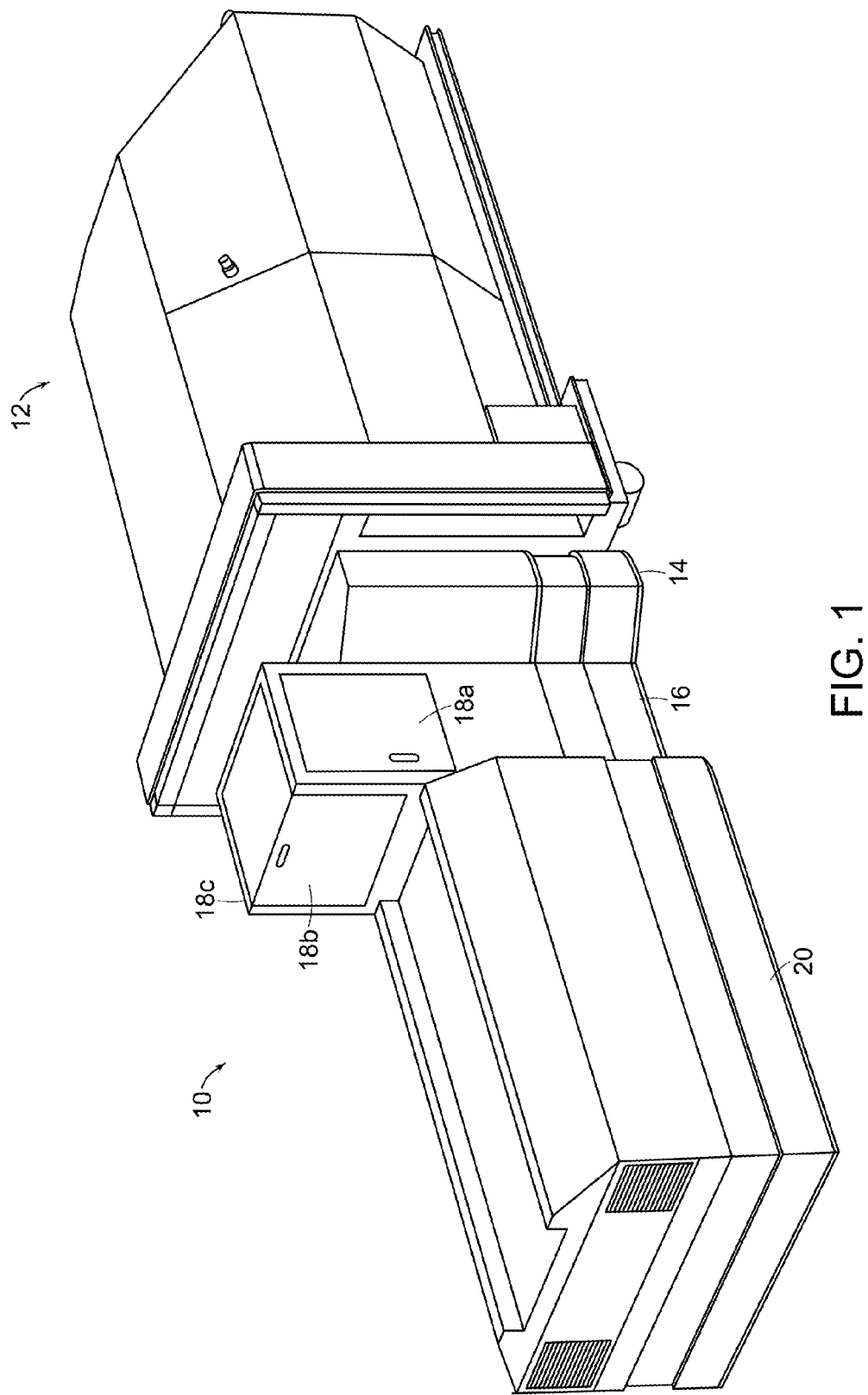
FIG. 1 is a perspective view of a waste compactor system according to this invention.

Waste compactor 10, FIG. 1, according to this invention is shown interconnected to a typical commercial waste container 12, which by regulation has the dimensions of 96 inch width×154 inch length×80 inch height. Waste container 12 can be removed from waste compactor 10 for transportation and disposal by a waste hauler.

Waste container 12 includes an opening (not shown) with dimensions of 39.5 inch width×30.5 inch height for receiving waste from waste compactor 10. The output opening of waste compactor 10 has smaller dimensions than the opening of waste container 12 and therefore includes an interface plate (described below), contained in housing 14, of similar dimensions to the opening in waste container 12 to enable the interface and interconnection of waste compactor 10 and waste container 12. A gasket (not shown) between the waste container 12 and the interface plate is typically included.

There is a compaction housing 16 within which the waste compaction occurs. Compaction housing 16 includes feeding doors 18*a-c* through which waste is inserted for compaction. Housing 20 includes other components of waste compactor system 10, such as the ram assembly, actuator, and liquid collection and evaporation system, which are all described in more detail below.

Waste compactor 10 and waste container 12 are typically stored on-site at facilities that are generators of significant amounts of waste materials. In some applications, the solid waste generated often has a fairly significant liquid component in the form of oils, water and other liquids, which greatly adds to the overall weight of the waste. When full, the waste container 12 is hauled away by a waste hauler to a waste facility for disposal.

Each time the waste hauler transports a waste container for disposal there is an associated hauling fee, which is referred to as a tipping fee. For a given period of time, the overall cost to dispose of the producer's waste is thus dependent on the number of instances a waste hauler needs to empty the waste container. This cost may be reduced by the use of on-site waste compaction, which allows for more waste to be stored in a waste unit, therefore reducing the number of times a waste hauler needs to empty the unit.

Another cost associated with the removal of the waste is the disposal fee, which is based on the overall weight of the waste stored in the waste unit. The liquid component in the waste significantly adds to the weight of the waste and thus the overall disposal cost. The disposal cost may be reduced by removing the liquid from the waste on-site before transporting the waste container. However, the liquid removed from the waste must then be separately disposed of which, while less costly than transporting it with the solid waste, still involves an associated liquid disposal cost.

Waste compactor 10 provides a more cost effective way of disposing waste by a) significantly reducing the size of the waste by using a high pressure compacting system, b) significantly reducing the weight of the waste by extracting liquid from the solid waste and disposing of the liquid on-site, and c) by reducing the cost of disposing the extracted liquid by evaporating a portion of the extracted liquid on site. More specifically, all of the waste liquid with a vapor pressure greater to or equal to water will be evaporated. The liquid with a vapor pressure less than water will be stored in a container and disposed of by a third party. In addition, these objectives are met while maximizing energy efficiency. A preferred embodiment, which achieves the above objectives, is described in more detail below.

Figure 2:
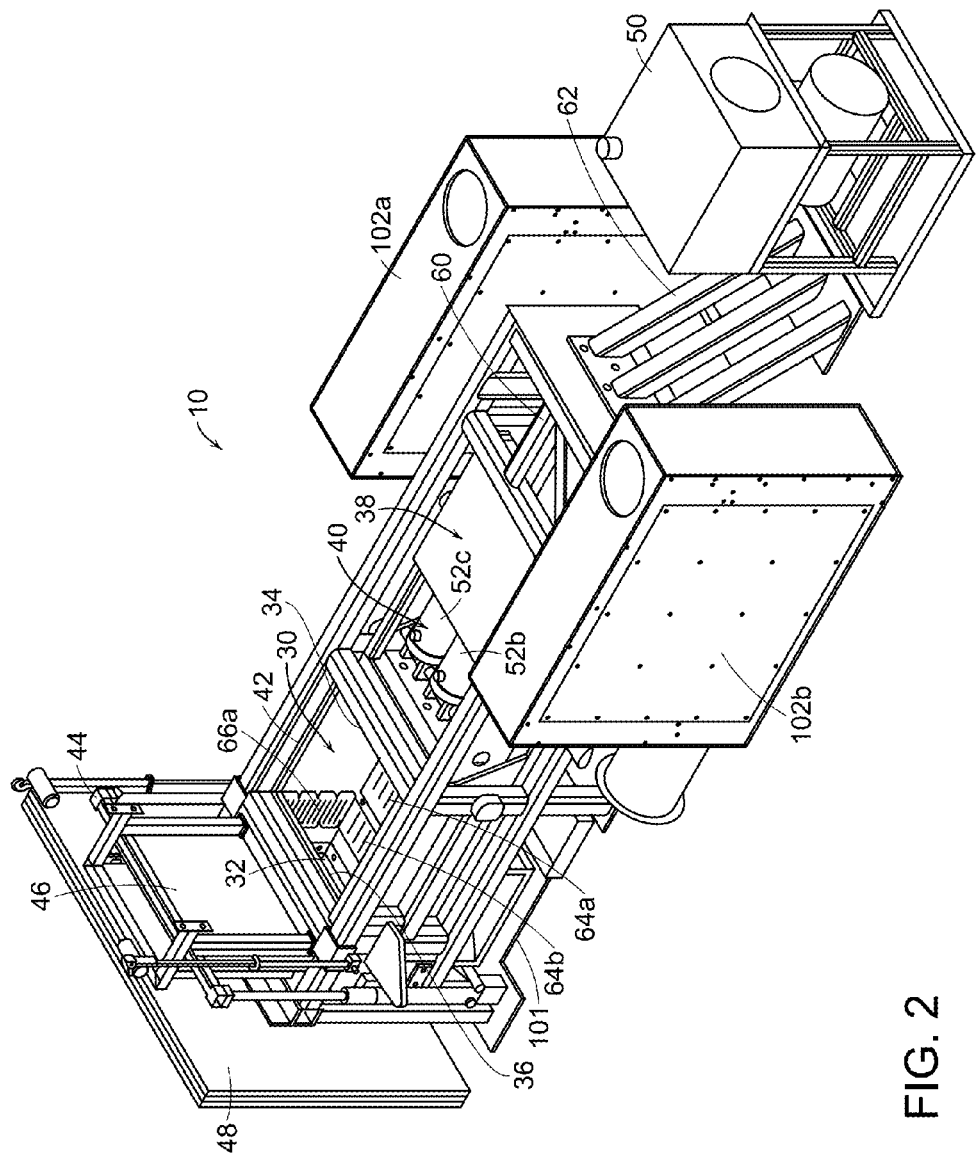
FIG. 2 is a perspective view of the waste compactor of FIG. 1 with the external housing removed so the components of the system are visible.

In FIG. 2, there is shown a compaction chamber 30 enclosed within housing 16, FIG. 1. Compaction chamber 30 has a first end 32 and a second end 34. Proximate first end 32 is a first opening 36 through which compacted waste may be transferred into waste container 12. Proximate the second end 34 of compaction chamber 30 is ram assembly 38 which is interconnected to actuator system 40. Actuator system 40 moves ram assembly 38 from a retracted position (as shown in FIG. 2), where it is located proximate the second end 34 of compaction chamber 30 to an extended position located proximate the first end 32 of the compaction chamber 34. Ram assembly 38 and actuator system 40 are contained within housing 20 shown in FIG. 1. The top plate of ram assembly 38 is removed in this figure so that components of actuator system 40 are visible.

Compaction chamber 30 also has a second opening 42 into which waste to be compacted may be inserted by an operator. The waste is inserted through opening 42 by opening either door 18*a*, 18*b*, or 18*c* in housing 16 shown in FIG. 1. When the waste has been inserted into compaction chamber 30, the operator may activate the waste compactor to begin a compaction mode to compact the waste into compacted waste units or blocks which are formed by the pressure exerted on the waste by the ram assembly 38 as it compacts the waste in the compaction chamber 30 against a closure assembly 44, which includes a gate 46.

Gate 46 is shown in the open position in FIG. 2; however, it would be in the closed or sealed position during the compaction mode. Once the waste is compacted into a compacted waste unit or block gate 46 is opened and ram assembly 38 is activated to move the compacted waste unit through closure assembly 44 and through an opening in an interface plate 48 into waste container 12. Interface plate 48 is affixed to closure assembly 44, and enables the interface of waste compactor 10 with waste container 12.

Figure 3A:
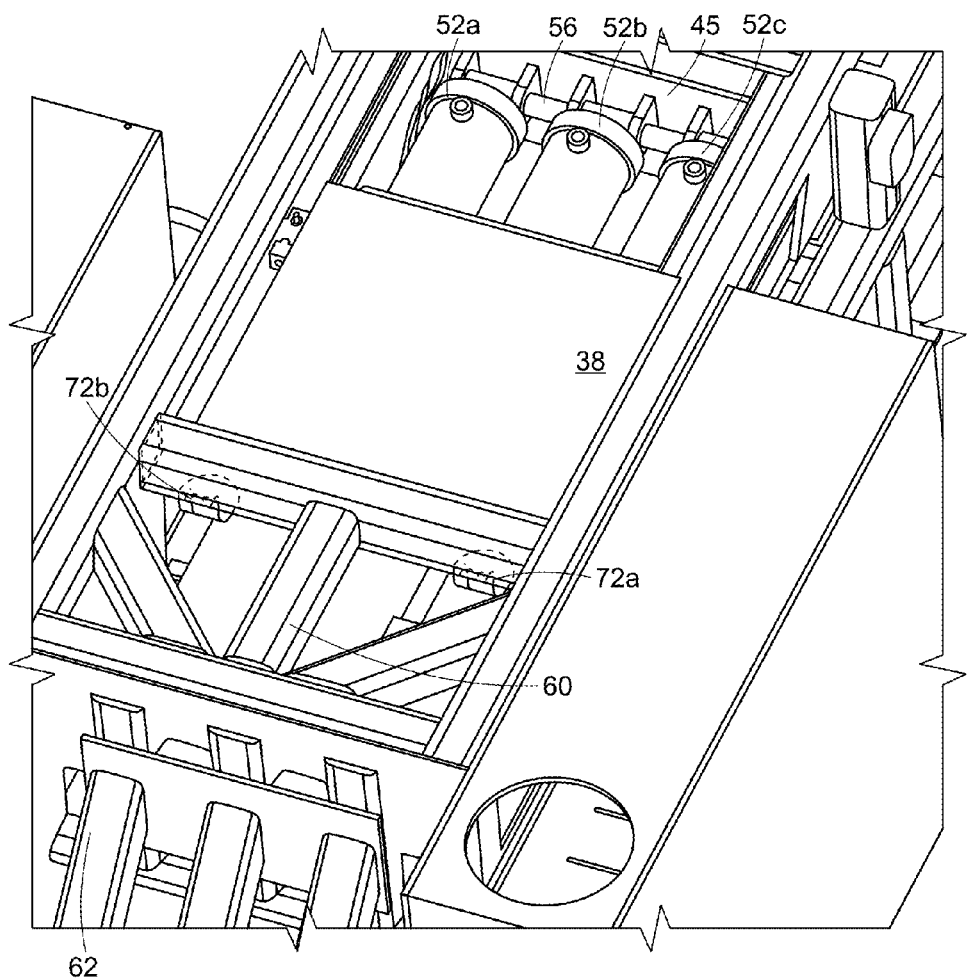
FIGS. 3A-C are perspective views of the ram and actuator assemblies.

Actuator system 40 includes a hydraulic system 50 which includes a pump and a reservoir that are interconnected to hydraulic cylinders 52*a-c*, depicted in more detail in FIG. 3A. Hydraulic system 50 may also include a flow divider to ensure an equal amount of hydraulic fluid is distributed to hydraulic cylinders 52*a-c*. The cylinders 52*a-c* are located within the interior 54, FIG. 3C, of ram assembly 38 and a piston of each cylinder is affixed to ram assembly 38 via a single common coupler 45. To secure the cylinders to the coupler, rod 56 passes through the apertures in common coupler 45 and through apertures at the ends of the pistons in cylinders 52*a*-52*c*. Waste compactor 10 is designed to produce very high pressure compaction, on the order of more than 100 psi on the compaction surface 58, FIG. 3B, of ram assembly 38 and even up to as much as 570 psi. A hydraulic pressure of approximately 3000 psi of pressure would be required for 570 psi of pressure on compaction surface 58 of ram assembly 38. At these pressures, waste compactor 10 provides for a minimum waste compaction ratio of 10:1. Although, not shown in the figures, a pressure sensor on the hydraulic fluid line would be used to determine hydraulic pressure and then the pressure exerted by the ram assembly can be readily determined based on the compaction surface.

To ensure a smooth transfer of hydraulic pressure to ram assembly 38, common coupler 45 provides a more uniform transfer of force from the individual hydraulic cylinders 52*a-c* to the ram assembly 38 to enable smooth travel through the compaction chamber 30. The common coupler 44 decreases the likelihood of more force being applied to one side of the ram assembly 38 by cylinders 52*a-c* being individually coupled to ram assembly 38. Brackets 60 and braces 62, both depicted in FIG. 2, which are connected to housing 20, FIG. 1, provide resistance to the high forces generated by actuator system 40 as it causes ram assembly 38 to compact waste in waste compaction chamber 30.

Sensors 72*a* and 72*b*, FIG. 3A, e.g. spring pot sensors, mounted on ram assembly 38 are used to detect the position of ram assembly 38 as it travels within compression chamber 30. The position information is used by the control system in the compaction and disposal modes as described below with respect to FIGS. 9A-C.

Referring again to FIG. 2, there are a plurality of slots 64*a,b* and 66*a,b* in the bottom surface and opposing side surfaces, respectively, of compaction chamber 30. Slots 66*b* are not visible in FIG. 2. The slots are used to allow liquid extracted from the waste when high pressure is applied to the waste by the ram assembly 38 during the compaction mode to exit compaction chamber 30. The slots may take on other shapes and sizes. They may be formed in one or more internal surfaces of compaction chamber 30. With the design of the preferred embodiment, waste compactor 10 is capable of processing solid waste to have a final liquid waste content of 30%, regardless of the starting liquid waste content of the unprocessed solid waste.

The number, location, and size of apertures in the surface(s) may be selected based on the particular application to achieve the desired amount of liquid removal, while preventing an excessive amount of solid waste material from passing through the apertures. Hydraulic pressure caused by compacting the liquid waste in the compaction chamber must be considered in conjunction with the pressure caused by compacting the solid waste. Too few apertures with a high ram assembly pressure will require additional structural support for the compaction chamber and the overall waste compactor system 10. One skilled in the art will optimize the design based on the required specifications and parameters desired.

Figure 3B:
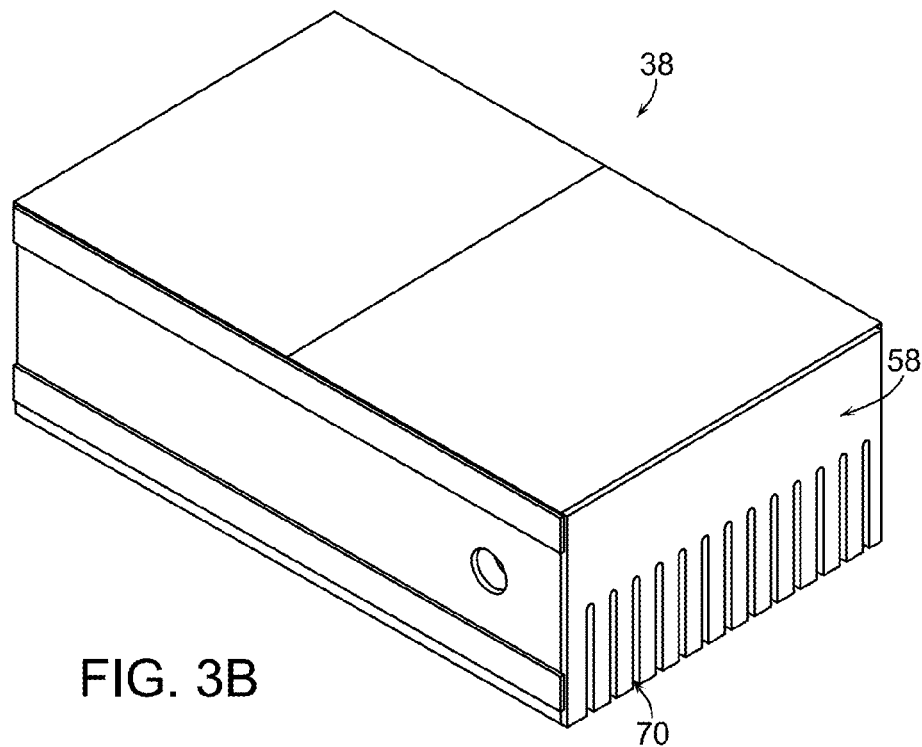
Figure 3C:
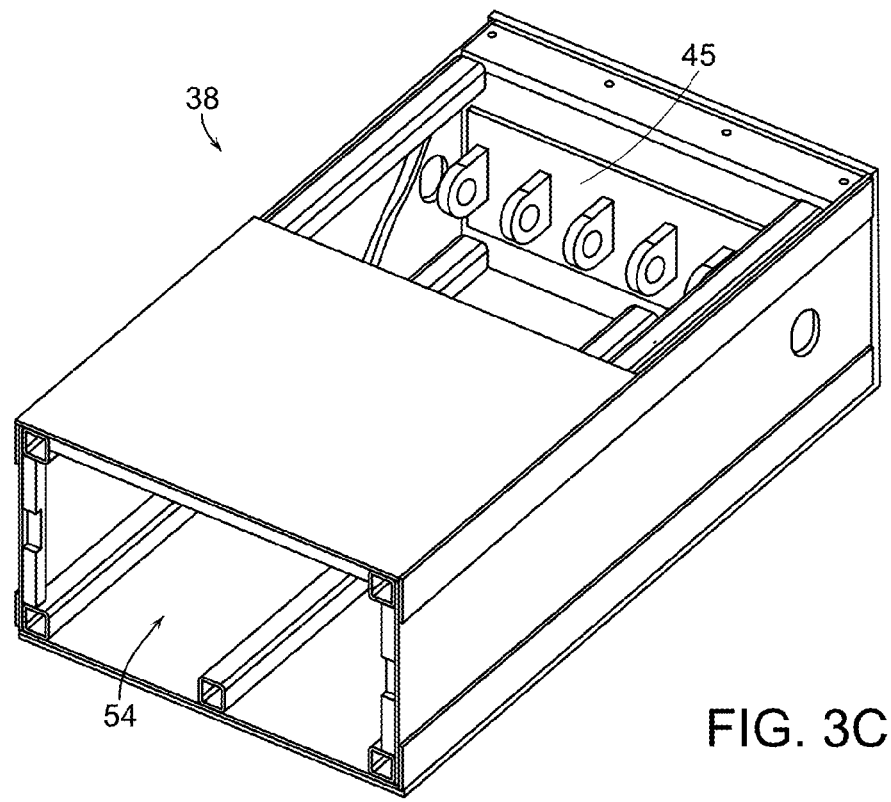

Additionally, channels 70, FIG. 3B, may be included on the compaction surface 58 to facilitate flow of the liquid from the compaction surface 58 to the plurality of slots 64*a,b* in the bottom surface of the compaction chamber 30.

Figure 4:
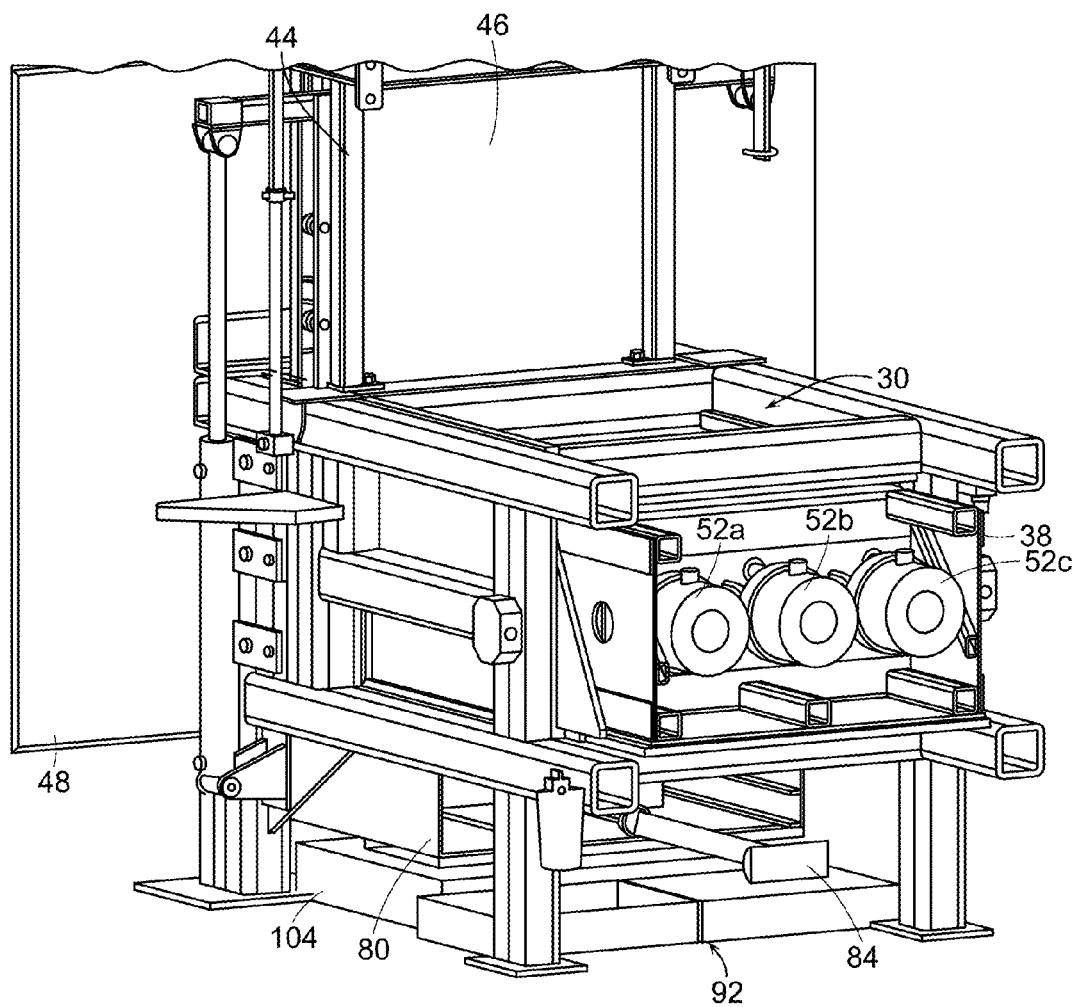
FIG. 4 is a cross sectional view of the waste compactor of FIG. 2 taken across the ram assembly.
Figure 5:
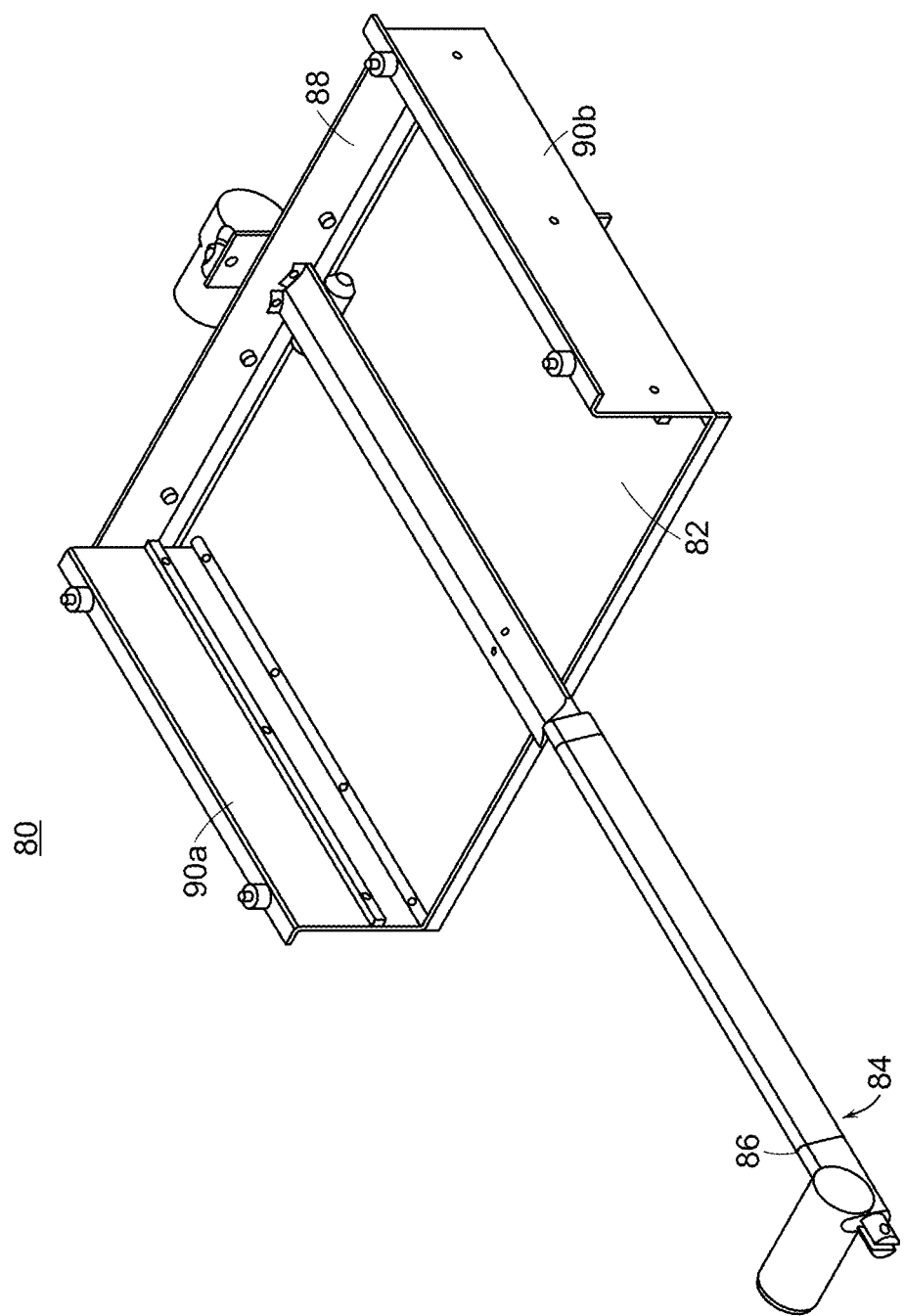
FIG. 5 is a perspective view of the filter unit of the liquid collection system according to this invention.

Liquid from the slots 64*a,b* and 66*a,b* exits compaction chamber 30 and enters filter unit 80, FIGS. 4 and 5. The liquid passes through screen filter 82 and captures on its surface solid waste material which passed through slots 64*a,b* and 66*a,b* in compaction chamber 30. A mesh that can screen particles of a size 115 microns or larger is suitable. Cleaner system 84 includes a rod 86 and squeegee 88 affixed to an end of rod 86. The cleaner system is periodically activated to cause the rod to retract and pull the squeegee across the surface of filter 82 to remove solid waste and dispose of into container 92, which may comprise a single container or multiple smaller containers. However, the cleaner system is not activated during the movement of the ram assembly in order to contain the solid waste. Container 92 may be periodically emptied as part of routine servicing. Filter unit 80 further includes sidewalls 90*a,b* to ensure that the solid waste material is contained on the surface of filter 82 when squeegee 88 travels across it and moves the solid waste into container 92.

After the extracted liquid has been filtered by filter unit 80 it then passes to a liquid separation system 101 and on to evaporation systems 102*a,b*, FIG. 2. The combination of filter unit 80, liquid separation system 101 and evaporation systems 102*a,b* are collectively referred to as the liquid collection system.

Figure 6:
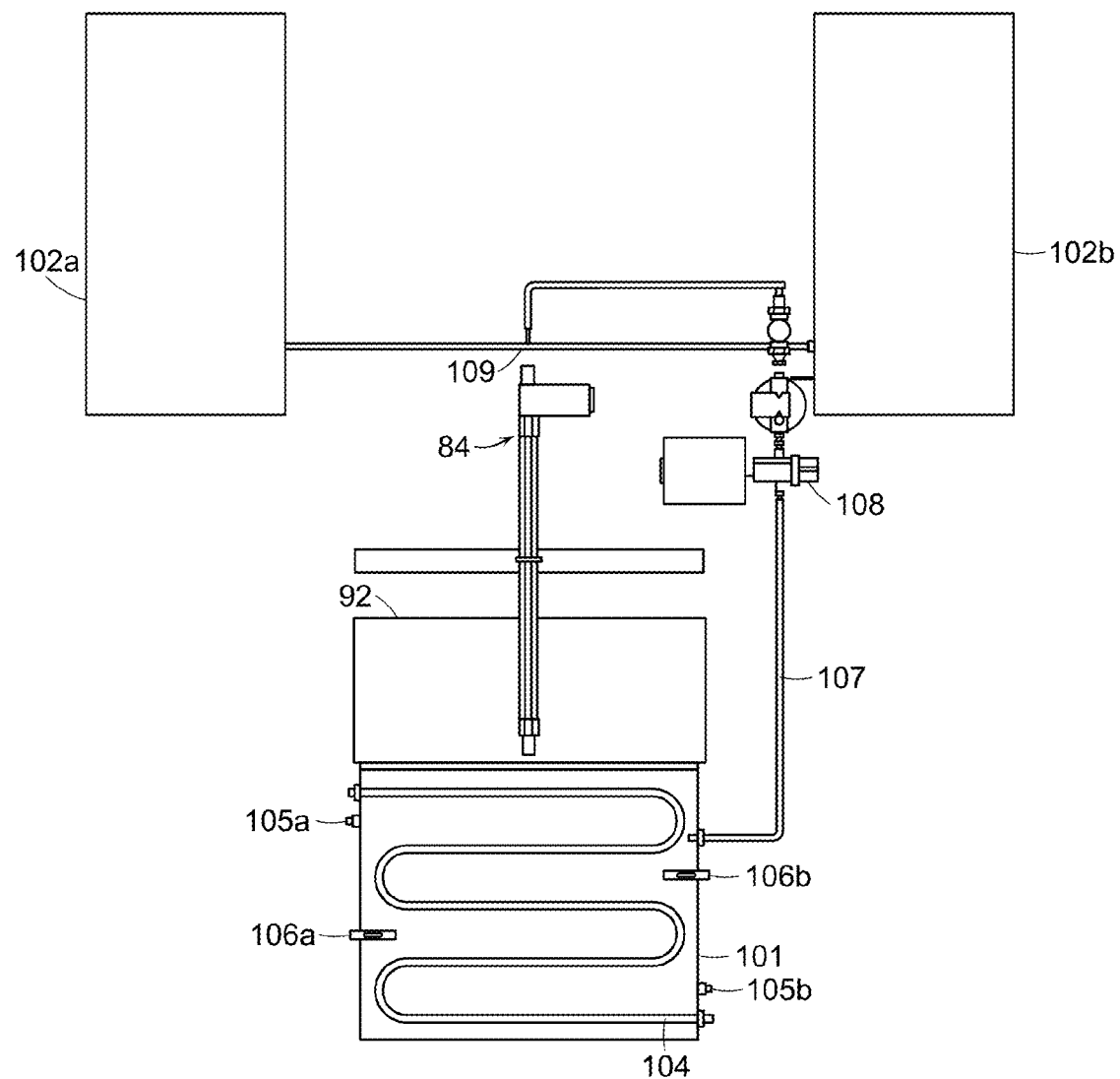
FIG. 6 is a top down view of the liquid separation system of the liquid collection system according to this invention.

Liquid separation system 101 is shown in more detail in FIG. 6 to separate the filtered liquid into two components, a first liquid component having a vapor pressure greater than or equal to the vapor pressure of water and a second liquid component having a vapor pressure less than the vapor pressure of water. The filtered liquid is heated using heating tubes 104 which, in the preferred embodiment, carry hydraulic fluid from the hydraulic system. Conductivity sensors 105*a,b* and liquid level sensors 106*a,b* are used for detecting the conductivity and the level (high and low), respectively, of the liquid.

Insulated piping 107 is connected to a drain in liquid separation system 101 to remove the first liquid component as it is pumped by pump unit 108 (which includes a filter) to evaporation systems 102*a,b* via insulated piping 109.

The first liquid component is located on the bottom of the container due to its greater density and pumped until the conductivity sensors 105*a,b* detect a change in conductivity indicating that the first liquid component has been pumped out of the container and the level of the second liquid component has dropped. Pump 108 to evaporation systems 102*a,b* are turned off and compaction within compaction chamber 30 is halted. The second liquid component can then be removed via a gravity drain or other suitable means. Subsequently compaction within compaction chamber 30 is reinitiated allowing for liquid collection to begin again until the high level liquid sensor detects the liquid collection container is full. Pump 108 is restarted and pumping of the first liquid component to the evaporation system begins again. The low liquid level sensor may be used to determine when the second liquid component has been removed from the container.

In FIG. 2 two evaporation systems 102*a,b* are shown; however, it is not a requirement of this invention and a single evaporation system may be used. In FIGS. 7A and 7B the configuration of a single evaporation system 102*a* is shown. Evaporation system 102*b* may have the same configuration.

The first liquid component having a vapor pressure greater than or equal to the vapor pressure of water, is received via tubing 109 (shown in FIG. 6) into input duct 110 and attached to spray nozzles 112*a* and 112*b*. Spray nozzles, such as the PJ Fog Nozzle, supplied by Bete Fog Nozzle, Inc. may be used. The spray nozzles should produce a droplet size of no greater than 300 microns and ideally 50-100 microns. While two spray nozzles are shown, any number could be used depending on the application.

Fan 114 is provided proximate the interface between the input duct 110 and the evaporation chamber 116 to entrain the spray of droplets emitted by nozzles 112*a,b* and carry them in the airflow throughout evaporation chamber sections 118, 120, and 122. In the preferred embodiment, the total length of evaporation chamber 116 is 15 linear feet and the nominal operating flow rate of fan 114 is 500-1,000 cfm with a min/max flow rate of 200/2,000 cfm respectively. Evaporation chamber sections 118, 120, and 122 are folded over on one another to achieve a sufficiently long evaporation chamber while minimizing the footprint of the evaporation system 102*a* and hence the overall waste compactor 10. The airflow is emitted to the atmosphere through outlet 124 at the end of evaporation chamber section 122.

The velocity of the airflow produced by the fan 114 is selected to ensure sufficient retention time in the evaporation chamber 116 to optimize evaporation based on the various conditions. It would be a goal to minimize the length of the evaporation chamber but various factors such as droplet size, liquid temperature, and airflow velocity must be considered for the particular application One or more mist collection pads (not shown) are provided to collect any remaining moisture in the airflow. The mist collection pads may be constructed by, for example, sandwiching a 14" non-woven, polyester filter pad between two plastic plates. The moisture collected is then re-circulated for an additional pass through the evaporation system 102*a*. Additionally, one or more filters may be included at the output 114 to reduce or eliminate environmental impact of the exhausted airflow.

Figure 8:
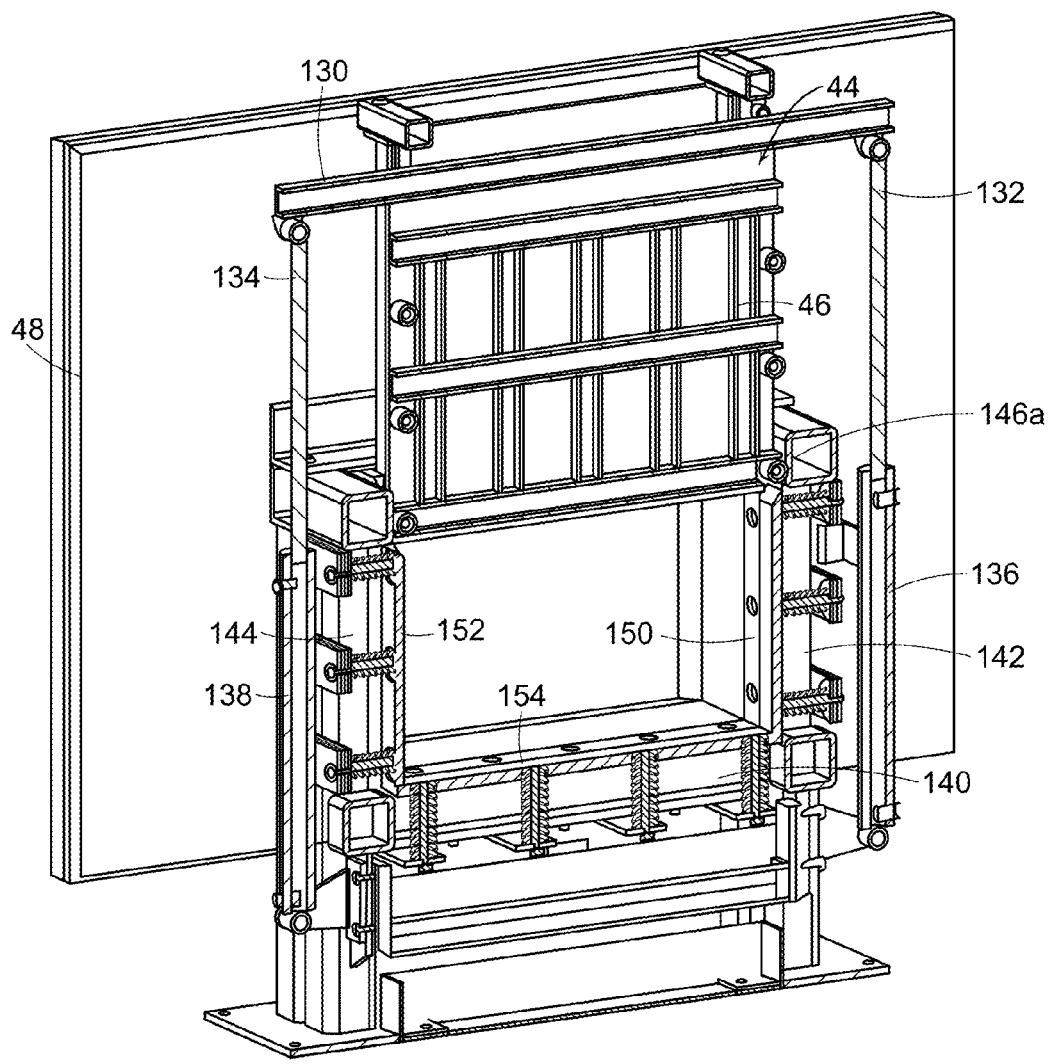
FIG. 8 is a cross sectional view of the closure assembly of the waste compactor according to this invention.

Referring to FIG. 8, closure assembly 44 is shown in more detail. Affixed to interface plate 48, is closure assembly 44, which includes gate 46. Gate 46 is closed when waste is being compacted in the compaction chamber 30 and is opened when the compacted waste units are to be passed into waste container 12. The top of gate 46 is attached to a header 130 which is connected on opposite sides to hydraulic cylinders 132 and 134, which travel up and down within rails 136 and 138, respectively.

Closure assembly 44 includes a bottom spring plate assembly 140 and two side spring plate assemblies 142 and 144. The side spring plate assemblies 142 and 144 are positioned flush with the side edges of gate 46 and as gate 46 is lowered into the closed position, plates 150 and 152 engage with the side edges of gate 46. As the sides of plate 46 engage with plates 150 and 152, the plates are forced in the outward direction and the springs of the of side plate assemblies 142 and 144, respectively, are compressed. The gate 46 may contain rollers, e.g. 146a and 146b, positioned slightly outward, on the side edges which interface with the plates 150 and 152 of side spring plate assemblies 142 and 144. This not only reduces the friction between the gate surfaces and the side spring plate assemblies with the compaction chamber reducing maintenance but it also properly seals gate 46 during compaction mode preventing the liquid from discharging out the gate. The side spring plate assemblies also ensure that there are no gaps where waste material may become caught during the compaction or disposal of waste as it travels through the compaction chamber 30. Furthermore, the side spring plate assemblies provide mechanical support to the closure assembly more specifically the gate when the waste compactor system is in compaction mode.

Bottom spring plate assembly 140 is positioned in a recess in the bottom surface of the compaction chamber 30 (not shown in FIG. 8). When gate 46 closes and engages with plate 154 of bottom spring plate assembly 140, the springs are compressed and gate 46 travels into the recess below the surface of the compaction chamber 30. This creates a seal between the gate and the bottom surface of the compaction chamber when the gate 46 is in the closed position. As with the side spring plate assemblies 142 and 144, this prevents the liquid from discharging out of the bottom of gate 46 and provides mechanical support to the closure assembly when under pressure. It also ensures that there are no gaps where waste material may become caught during the compaction or disposal of waste as it travels through the compaction chamber 30.

Figure 9A:
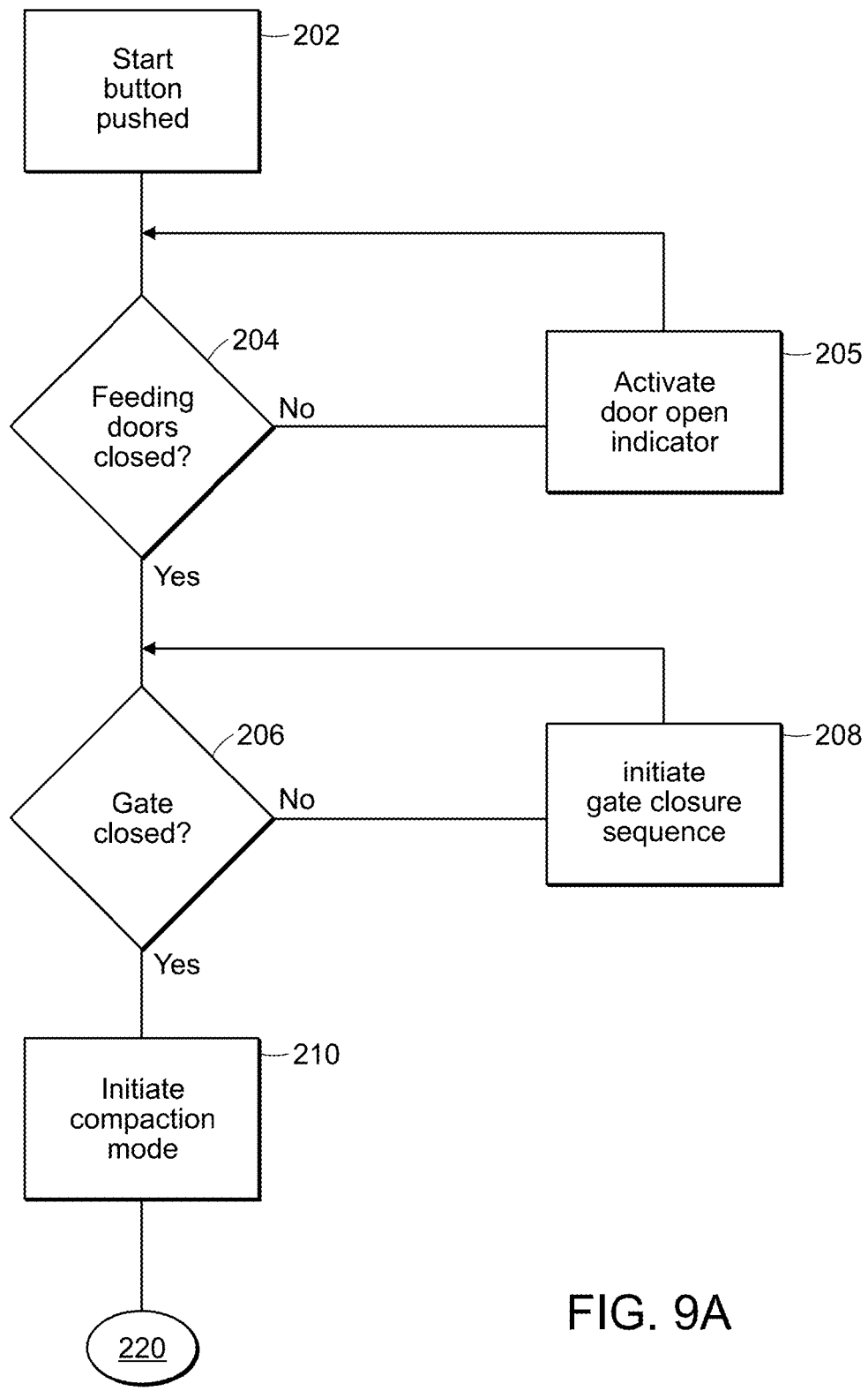
FIGS. 9A-C are flow charts depicting the operation of the control system of the waste compactor according to this invention.
Figure 9B:
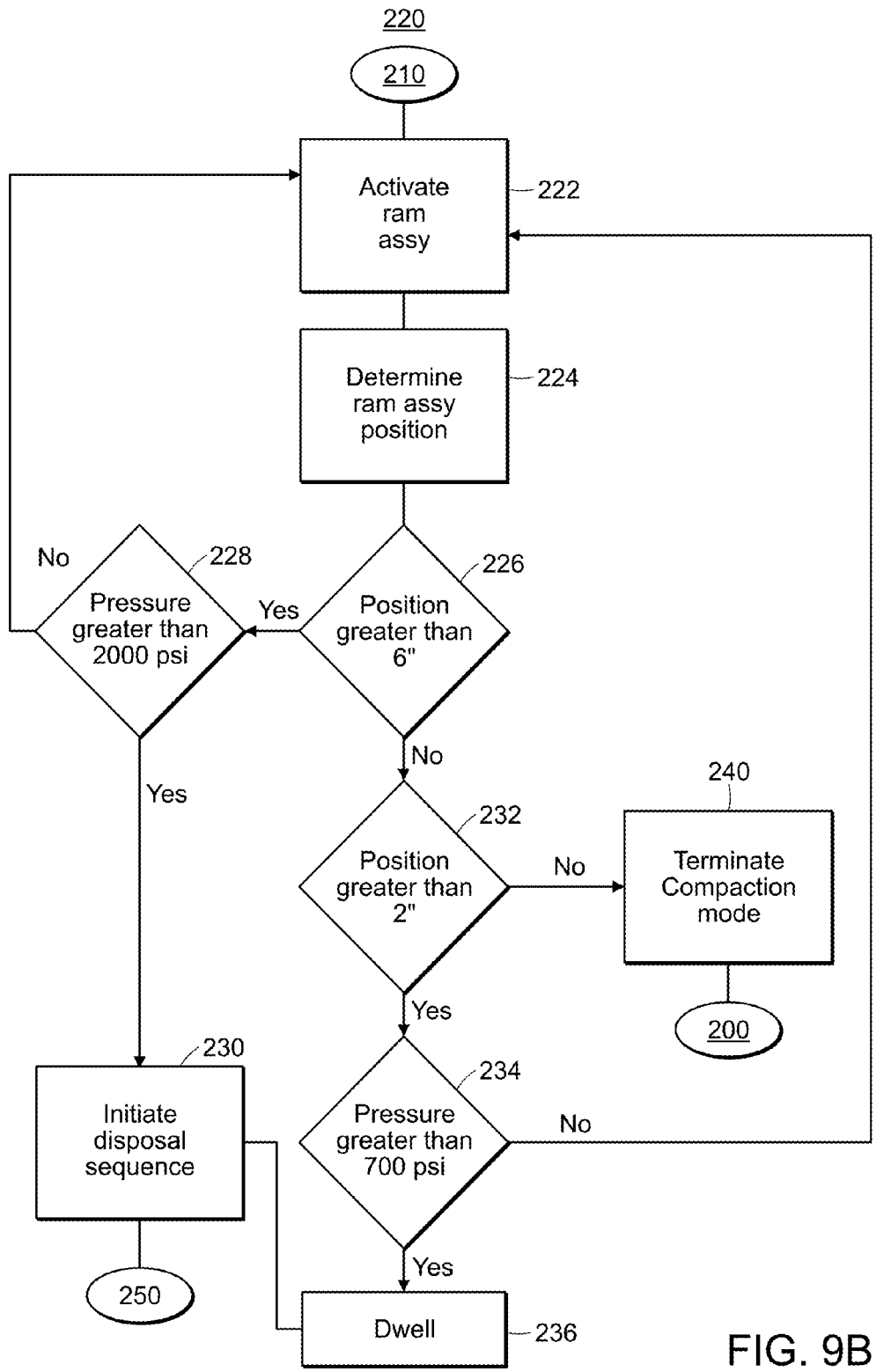
Figure 9C:
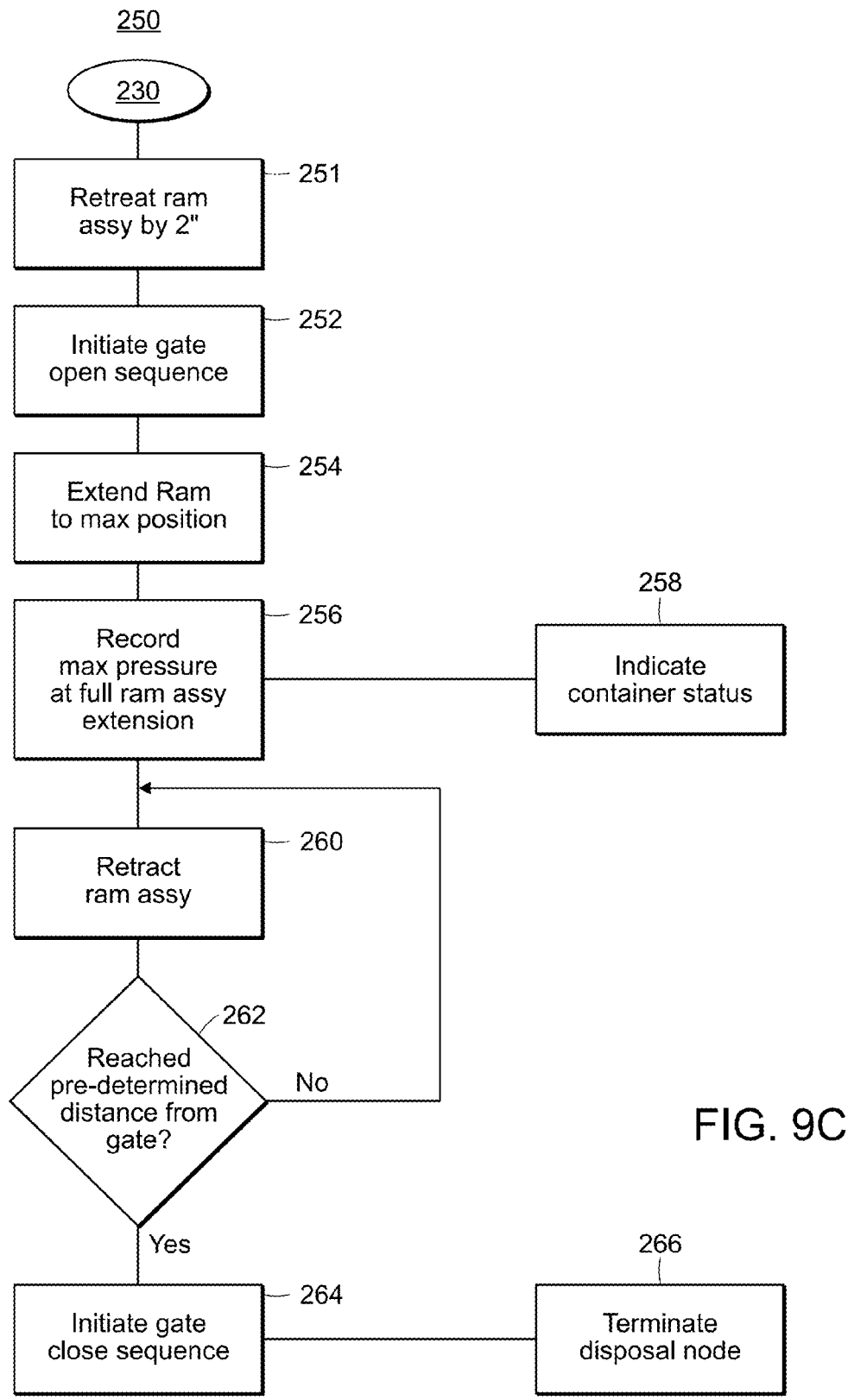

The operation of waste compactor 10 is controlled via a control system which operates according to flow charts depicted in FIGS. 9A-C. In FIG. 9A, flow chart 200 describes the start up sequence. In step 202 an operator activates the start-up of waste compactor 10 by pushing a start button. In step 204, the system queries whether the feeding doors 18a, b,c, FIG. 1, are open. If they are, an indicator is activated at step 205 to alert the operator that the feeding doors are open. If the feeding doors are closed, the system proceeds to step 206 to determine if gate 46 of closure assembly 44 is open. If the gate is open, at step 208 a gate closing sequence is initiated and a redetermination is made at step 206 if the gate is closed. Furthermore, if it is determined that the gate is closed at step 206, the compaction mode is initiated at step 210.

The compaction mode sequence is described in flow chart 220, FIG. 9B. At step 222 ram assembly 38 is activated to begin forward movement to compact waste in the compaction chamber 30. At step 224 the position of ram assembly 38 is determined using data provided by position sensors 72a and 72b, FIG. 3A. At step 226, it is determined if ram assembly 38 has at least reached the start of the ideal compaction zone within the compaction chamber, which is defined as a zone between +2 inches from gate 46, FIG. 2, and +6 inches from gate 46. The distances used herein are simply for describing a preferred embodiment and are in no way limiting. The location of the ideal compaction zone may be varied depending on the application. The specific query at step 226 is whether the position of the ram assembly 38 is greater than +6 inches from gate 46. If the position is greater than +6 inches, this indicates that ram assembly 38 has not yet reached the ideal compaction zone.

If the distance is greater than +6 inches the hydraulic cylinder pressure is then checked to determine if it exceeds a pre-determined pressure level at step 228. In the preferred embodiment, the level is 2000 psi of hydraulic pressure, which translates into approximately 380 psi of pressure on compaction surface 58 of ram assembly 38. The pressure level may be varied depending on the application.

If this pressure level has been exceeded, this indicates that a substantially non-compressible object is located in the compaction chamber impeding forward motion of ram assembly 38. Therefore, the compaction mode is terminated when at step 230 the disposal sequence is initiated in order to remove the non-compressible object from the waste compactor 10 and dispose of it in the waste container 12. Alternatively, if the pressure at step 228 does not exceed the predetermined level, the compaction mode and forward movement of ram assembly 38 continues and the system cycles back to step 222.

If at step 226 the position of the ram assembly 38 is determined to be less than +6 inches from gate 46, this indicates that ram assembly 38 is either in the ideal compaction zone (+2 inches to +6 inches from gate 46) or it has passed the ideal compaction zone (+0 inches to +2 inches from gate 46). Furthermore, if it is determined in step 232 that the ram assembly 38 is greater than +2 inches from gate 46, then the hydraulic cylinder pressure is checked at step 234 to determine if the pressure exceeds another, lower pre-determined pressure level. In the preferred embodiment, this pressure level is 700 psi of hydraulic pressure which translates to approximately 130 psi of pressure on the compaction surface 58 of ram assembly 38.

If the pressure level exceeds 700 psi at step 234, the system has thus detected that a desired pressure level, 700 psi of hydraulic pressure/130 psi of ram compaction pressure, has been achieved in the ideal compaction zone, indicating the formation of the desired size of a compacted waste unit for this preferred embodiment. As a result, at step 236 forward motion of the ram assembly 38 is stalled by the waste block within the compaction chamber and the pressure is held by the ram assembly for a short dwell time, e.g. 30 seconds, until the disposal sequence is initiated as set forth in FIG. 9C. By initiating the disposal sequence the compacted waste unit will be disposed of in the waste container 12.

If instead, at step 232 it is determined that the current ram assembly position is not greater than +2 inches from the gate, indicating it has passed the ideal compaction zone, then at step 240 the compaction mode is terminated and the ram assembly is fully retracted. The system waits for an operator to initiate a new start up sequence, pursuant to FIG. 9A, after more waste material has been loaded into the compaction chamber. This approach is taken to avoid transferring the compacted waste material into the waste container 12 before a desired size waste unit has been formed. Alternatively, instead of terminating the compaction mode at step 240, the system may be configured to automatically cycle through the compaction mode one or more additional times in the event there is additional waste to be compacted in the compaction chamber.

If, at step 234, it is determined that the pressure level does not exceed 700 psi, the compaction mode and forward movement of ram assembly 38 continues and the system cycles back to step 222.

In FIG. 9C, the disposal sequence is depicted in flow chart 250. At step 251 ram assembly 38 is backed away 2 inches from gate 46 in order to relieve the pressure off the gate when it is opened. The distances used herein are simply for describing a preferred embodiment and are in no way limiting. In step 252, gate 46 of closure assembly 44 is opened. At step 254, the ram assembly is extended to its maximum position to move the waste from the compaction chamber 30 into the waste container 12. The maximum pressure on surface 58 of ram assembly 38 is determined at step 256 and at step 258 the status of the waste container 12 is determined. A light indicator (not depicted) communicates to the operator the remaining capacity of the waste container. At step 260 the ram assembly is retracted and at step 262 it is determined if the ram assembly has reached a predetermined distance from gate 46, at which time at step 264 the gate 46 is closed. At step 266 the disposal sequence is terminated. The system waits for an operator to initiate a new start up sequence, pursuant to FIG. 9A.

Figure 10C:
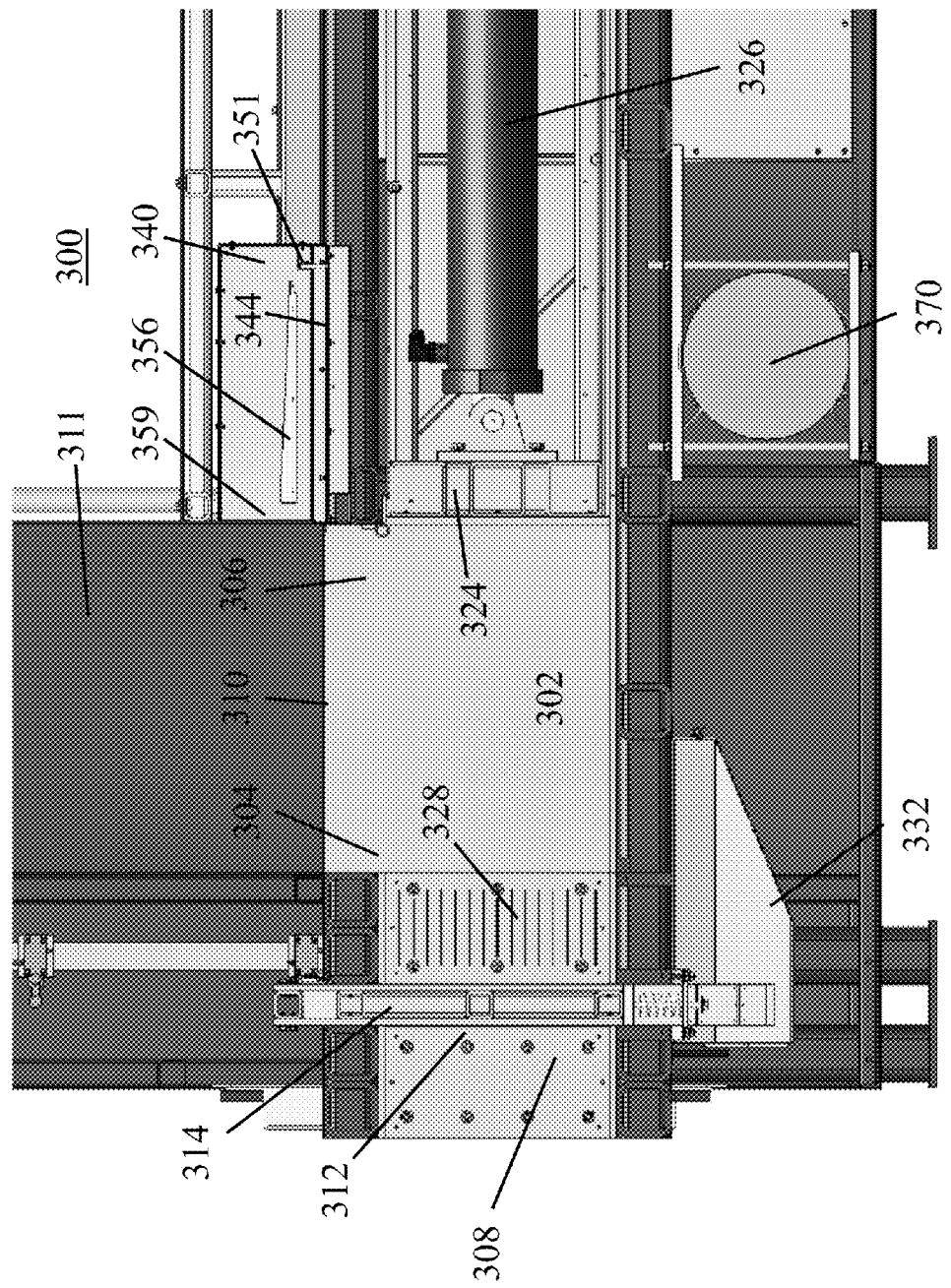

An alternative embodiment of the waste compactor according to this invention is shown in FIGS. 10A-C as waste compactor 300 for compacting waste into a plurality of compacted waste units for disposal. The waste compactor 300 includes a compaction chamber 302, in which the waste is compacted. The compaction chamber 302 has a first end 304 and a second end 306 and the first end 304 has an opening 308 for interfacing with a waste container, such as container 12, FIG. 1. The waste container may be any of the waste containers in the invention described above. A second opening 310 is also included in the compaction chamber 302, through which waste is inserted by an operator via hopper 311.

Additionally, a closure assembly 312 is disposed in the waste compactor 300 proximate first end 304 of compaction chamber 302 to seal the first opening 308 during a compaction mode. The closure assembly 312 may be configured to expose the first opening 308 before and after compaction of the waste. In this embodiment, the closure assembly 312 may include a gate 314 movable in a vertical direction. The gate may rise to an opened position to expose the first opening 308 (FIGS. 10A-B), and drop to a closed position to seal the first opening 308 (FIG. 10C). Waste compactor 300 further includes a ram assembly 324 interconnected with an actuator 326. The ram assembly 324 is disposed within the compaction chamber 302, and is actuatable from a retracted position proximate the second end 306 to an extended position proximate the first end 304 of the compaction chamber 302. In the compaction mode, the actuator 326 applies a force to the ram assembly 324 to move the ram assembly 324 from the retracted position toward the extended position to achieve a pressure on a compaction surface of the ram assembly 324 as it compacts the waste against the sealed closure assembly 312.

The closure assembly 312 may be configured to open, after compaction of the waste, and the ram assembly 324 may move to a second extended position proximate the first opening 308 of the compaction chamber 302. As the first opening 308 is interfaced with the waste container, the ram assembly 324 forces the compacted waste unit out of the compaction chamber 302 through the first opening 308 into the waste container.

Figure 11A:
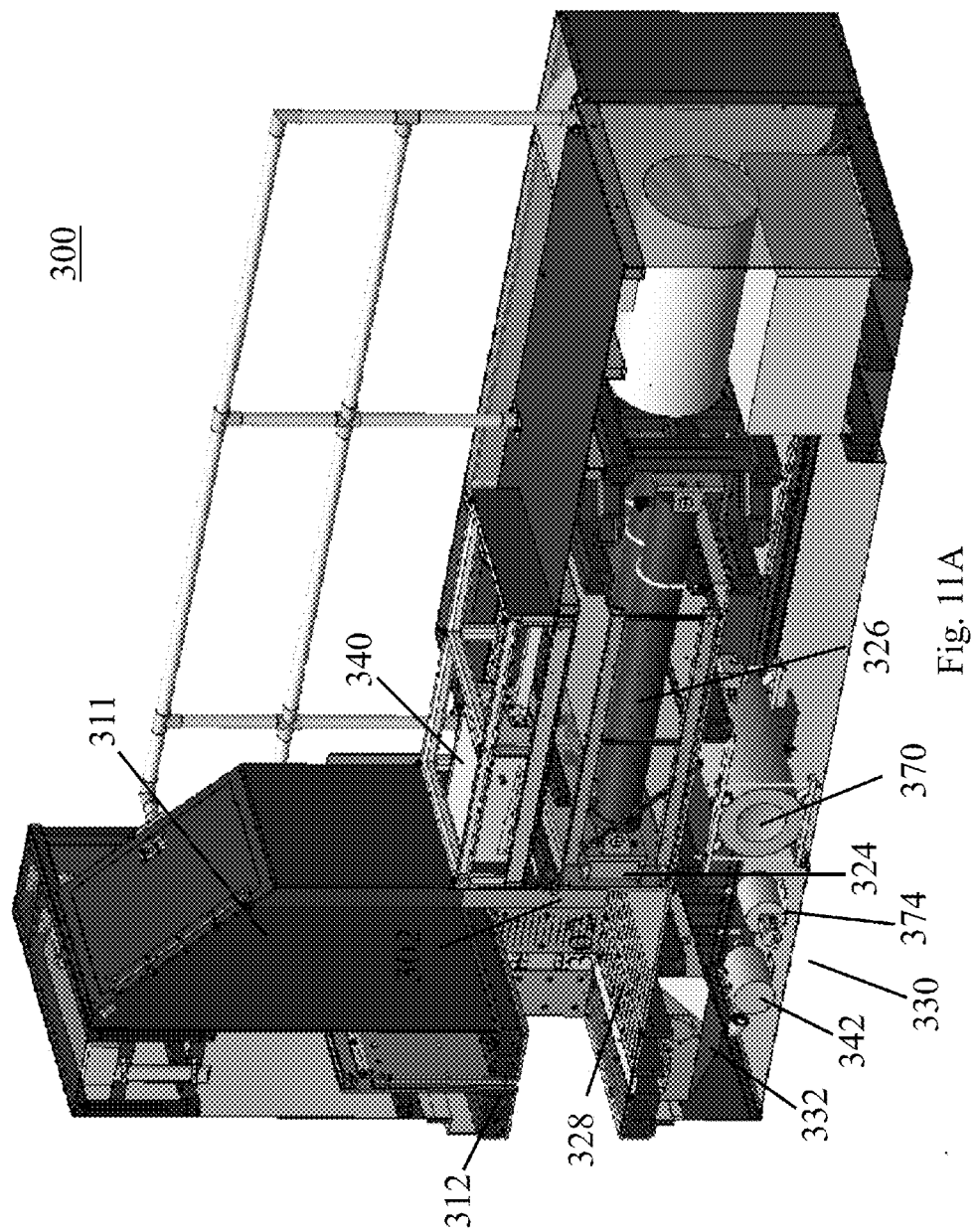
FIGS. 11A-B are perspective views of the waste compactor of FIG. 10 with the gate in the up position and the gate in the down position, respectively.
Figure 11B:
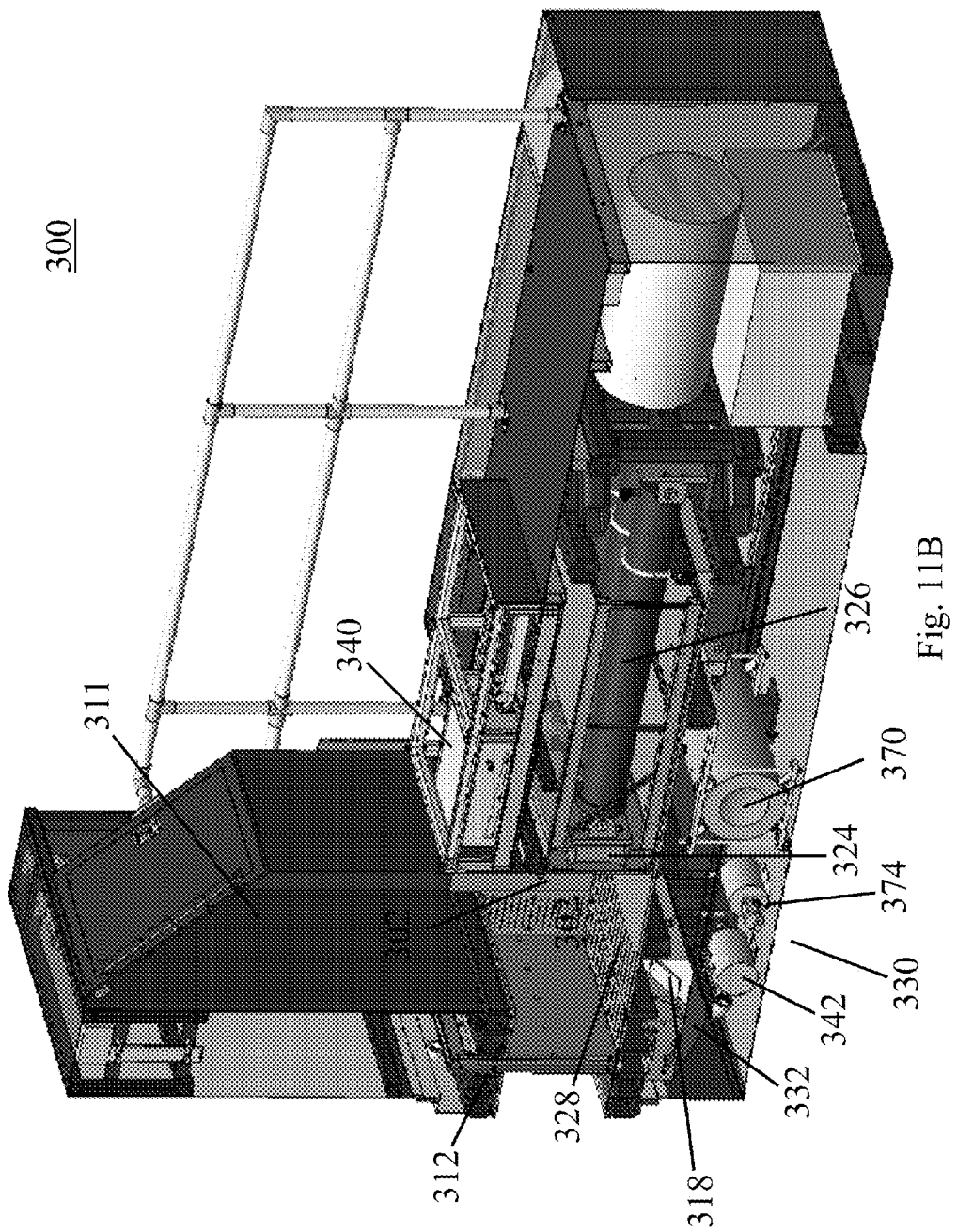

As shown in FIGS. 11A-B, a plurality of apertures 328 may be disposed in at least one internal surface proximate the first end 304 of the compaction chamber 302. In this example, the apertures 328 are shown in the bottom and side internal surfaces of the compaction chamber 302. The width of the apertures 328 may range from ¼ inch to ¹⁄₃₂ inch. In this example, the width is ¹⁄₁₆ inch. In the compaction mode, liquid and residual solid waste exit the compaction chamber 302 through the apertures 328, as the waste is compacted by the ram assembly 324 moving against the closure assembly 312.

A collection system 330 is also shown to collect the liquid and residual solid waste exiting the compaction chamber 302 during compaction. The collection system 330 may be further configured to separate the liquid and the residual solid waste, and evaporate the liquid. To achieve this, the collection system 330 includes a collection chamber 332 for receiving the liquid and the residual solid waste from the compaction chamber 302 through the plurality of apertures 328. The collection chamber 332 may be pyramidal in shape with the apex being at a lower point than the base and having a drain located at the apex. The shape of the collection chamber 332 may vary according to different embodiments of the invention. For examples, the collection chamber 332 may be cubic, cylindrical, or conical.

Referring to FIGS. 10A-C and 11A-B, the liquid and the residual solid waste then exit the collection chamber 332 and are transported to a filter unit 340. The filter unit 340 is configured to separate the liquid and the residual solid waste, and insert the residual solid waste back to the compaction chamber 302. The position of the filter unit 340 may vary. In this example, the filter unit 340 is positioned above the ram assembly 324. The collection system 330 also includes a line to transport the liquid and the residual solid waste from the collection chamber 332 to the filter unit 340, and the transportation may be driven by a pump 342, such as a macerator pump. Filter unit 340 separates the liquid and residual solid with a filter 344. The residual solid waste captured by filter 344 may be cycled back to the compaction chamber 302 through an opening 359 of the filter unit 340 by a scraper device 351. Opening 359 is in communication with the hopper 311 through which the residual solid waste is inserted into the compaction chamber 330. This operation will be described in more detail below.

The collection system 330 further includes a liquid collection vessel 370 configured to receive the liquid exiting from the filter unit 340 through the filter 344. The liquid collection vessel 370 may be disposed in various positions. In this example, the liquid collection vessel 370 is positioned under the ram assembly 324. Various shapes of the liquid collection vessel 370 are also within the scope of the invention. For example, the liquid collection vessel 370 may be cubic, cylindrical or conical.

Figure 15:
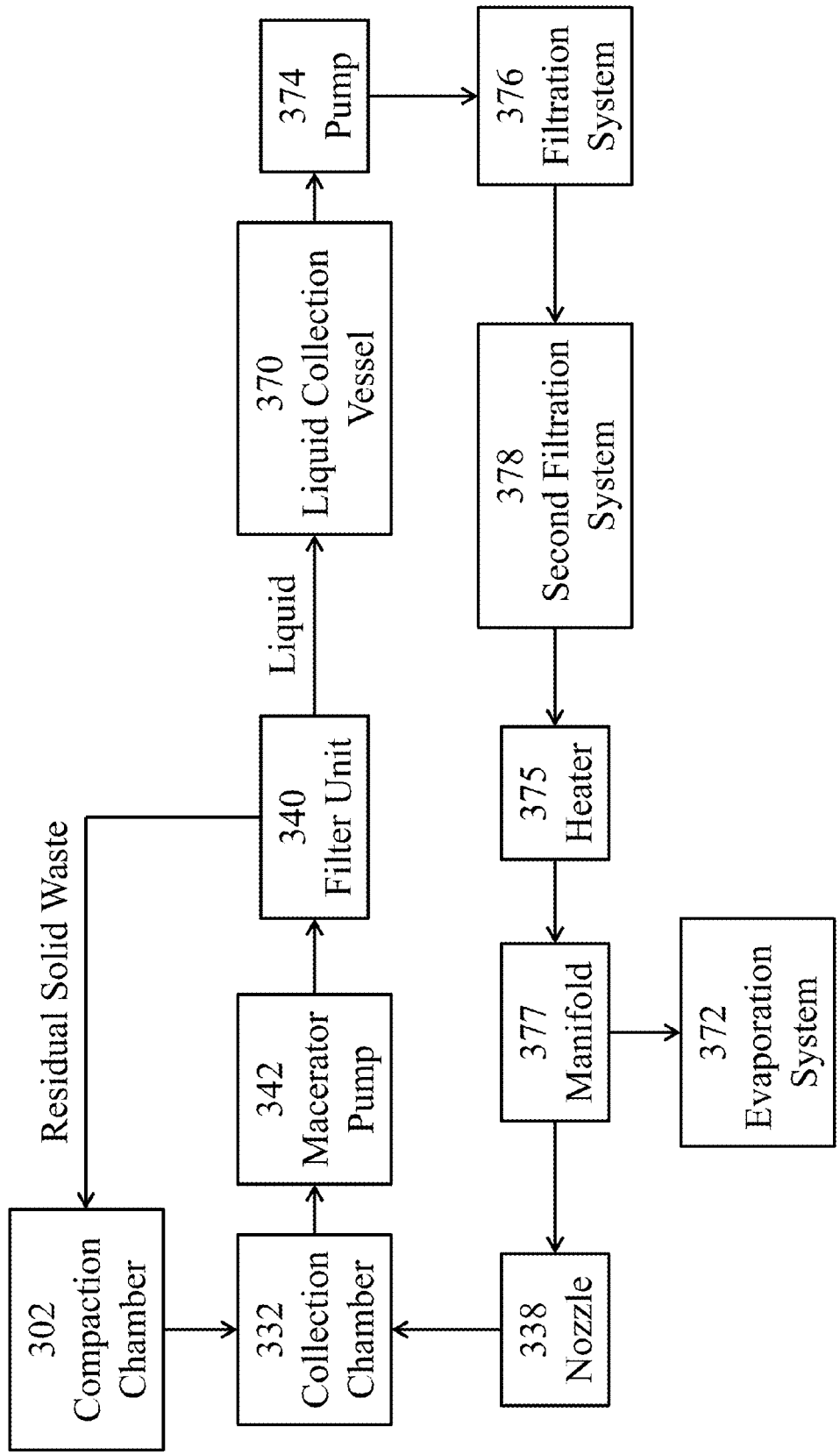
FIG. 15 is a block diagram illustrating the flow of liquids/solids in the waste compactor of FIG. 10.

A second line may be included in the collection system 330 to transport the liquid from the liquid collection vessel 370 to evaporation systems 372a and b, FIG. 13 A-B. The liquid may be transported by pump 374. Interposed between the liquid collection vessel 370 and the evaporation system 372 may be one or more filtration systems. In this example, a filtration system 376 is included and is configured to remove particles from the liquid. In some embodiments, the size of the particles removed by the filtration system 376 may range from 0.5 to 5 microns. A second filtration system 378 may also be included to remove hydrocarbons and odor from the liquid. In this example, activated carbon may be used in the second filtration system 378. After passing through the filtration systems, the liquid is heated with heater 375 to a temperature of approximately 140-160 degrees Fahrenheit before it passes to manifold 377 (visible in FIG. 10B), which delivers the heated liquid to evaporation systems 372a,b. Evaporation systems 372a,b may be configured in the same manner as evaporation systems 102a,b, as shown in FIGS. 2 and 7. In this example, the heated liquid from the manifold 377 also passes to nozzle 338 in collection chamber 332 to clean the surfaces of the collection chamber 332 as shown in FIG. 12 and FIG. 15.

FIG. 12 further provides a perspective view showing the collection chamber 332. The collection chamber 332 may also include at least one nozzle 338 for spraying the internal surfaces of the collection chamber 332. In a cleaning mode, the spray produced by the nozzle 338 may further remove the liquid and the residual solid waste from the internal surfaces of the collection chamber 332. In some embodiments, the nozzle may be configured to produce a flat spray. The spray angle may range from 30 degrees to 120 degrees. In this example, the spray angle may be around 65 degrees. The material used to make the nozzle may vary. For examples, the nozzle may be made of brass, stainless steel, silicon carbide, or plastic material. The size of the pipe connected to the nozzle may vary. The pipe may have a diameter ranging from ½ inch to 1/32 inch (e.g., ⅛ inch). A pressure may be produced by the nozzle 338 to the flow. The pressure may range from 5 psi to 2000 psi. The rate of the low produced by the nozzle may also range from 0.5 gpm to 10 gpm.

Figure 13A:
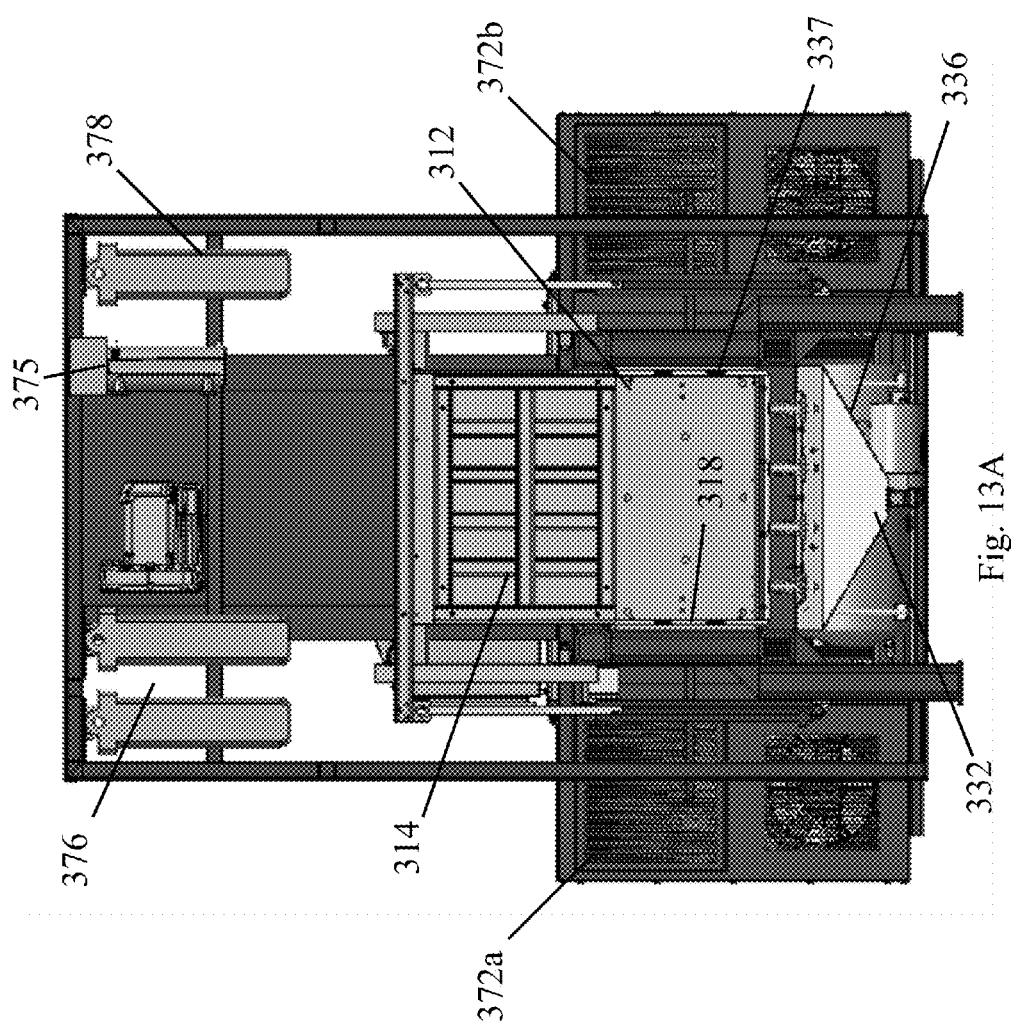

The closure assembly 312 further includes two vertical channels 316, FIG. 12, in which the two vertical sides of the gate 314 travel as the gate 314 is opened and closed. The vertical channels 316 may be configured to provide structural support to the gate 314 when the gate 314 is closed and receives pressure during the compaction. A filling member 318 is affixed to the bottom of each vertical side of the gate 314. Each of the filling members 318, FIGS. 13A-B, is configured to fill its respective vertical channel 316 as the gate 314 is opened. Referring again to FIGS. 13A-B, the collection chamber 332 may include an aperture 334 aligned with each of the filling members 318. As the gate is closed, the filling members 332 travel into the collection chamber 332 through the aperture 334. The collection chamber 332 has angled sidewalls 336 and the filling members 318 are hinged by at least one hinge 337 so that as gate 314 is closed, the filling members 318 may travel into the collection chamber 332 and conform to the angled sidewalls 336. In some embodiments, the material used to make the filling members 318 may vary. The filling members may be made of any type of a polymer. In this example, the polymer may be polyoxymethylene.

FIGS. 14A-D depict the operation of the filter unit 340. Disposed on the bottom internal surface of filter unit 340 is filter 344, which is configured to allow only the liquid to pass through, leaving the residual solid waste on the top surface of filter 344. Thus, upon entering of the filter unit 340, the liquid and the residual solid waste are further separated by the filter 344. The design of the filter 344 may vary in order to allow the separation. In this example, the filter 344 may include a filter material (not visible in FIG. 14A-D). The filter material has a plurality of openings with a mesh size of 24×24. The filter material uses wire that is 0.0075 inch in diameter and with an opening size ranging from 0.01 inch to 0.05 inch (preferably from 0.012 inch to 0.047 inch). In this example, opening size is 0.034 inch. The filter 344 may further include a perforated plate (not visible in FIG. 14A-D) to support the bottom of the filter material, the perforated plate having a plurality of holes with a width of ¼ inch. In other embodiments, the width of the holes may also vary (e.g., ranging from ½ inch to ⅛ inch).

Filter unit 340 also includes the scraper device 346 interconnected to a first actuator 348. The scraper device 346 travels from a first end 350 to a second end 352 of the filter unit 340 across the top surface of the filter 344 in an extension mode. The scraper device 346 travels from the second end 352 to the first end 350 in a retraction mode. The scraper device 346 may be driven by any power resources. In this example, the scraper device 346 is driven by a motor 354.

Guide members 356 are disposed on two opposite internal surfaces of the filter unit 340 and extending from proximate the first end 350 to proximate the second end 352 of the filter unit 340. In the extension mode, FIG. 14A-B, the scraper device 346 travels under the bottom surfaces 358 of the guide members 356 to maintain contact between the scraper device 346 and the filter 344. The distance, d, between the bottom surface 358 of guide members 356 and filter 344 may be equal to or less than the height, h, of scraper device 346 to ensure there is contact with and positive pressure exerted on the surface of filter 344 by scraper device. In a preferred embodiment, the difference between h and d is 0.123 inch. As a result, the scraper device 346 removes the residual solid waste remaining on the on the top surface of the filter 344, and forces the residual solid waste out of the filter unit 340 through the opening 350.

In retraction mode, FIGS. 14C-D, the scraper device 346 is in contact with the top surfaces 360 of the guide members 356 as the scraper device 346 moves from the extended position to the retracted position to maintain separation, s, between the scraper device 346 and the filter 344. Upon extension of scraper device 346, a second actuator 362 moves the scraper device 346 up and away from the top surface of the filter 344. As scraper device 346 is being retracted and moved up it is positioned on the top surfaces 360 of the guide members 356 as the scraper device 346 moves from the second end 352 to the first end 350 of the filter unit 340 in the retraction mode. This is done to ensure that any remaining residual solid waste on the filter 344 is not forced back toward the first end 350 of the filter unit 340. The second actuator 362 may be driven by any power resource. In this example, the second actuator 362 is driven by a motor 364. The top surfaces 360 of guide members 356 may be angled downward from the second end 352 of filter unit 340 toward the first end 350 so that the separation, s, between scraper device 346 and the surface of filter 344 decreases as the scraper device moves toward the first end 350. Once in the fully retracted position the scraper device 346 comes off of the guide members 356 and is position on the surface of filter 344 by the second actuator 362.

A system block diagram showing flow the liquid and residual solid waste as they pass through the various components of waste compactor system 300 is shown in FIG. 15.

While preferred embodiments of the present invention have been shown and described herein, various modifications may be made thereto without departing from the inventive idea of the present invention. Accordingly, it is to be understood the present invention has been described by way of illustration and not limitation. Other embodiments are within the scope of the following claims.

The invention claimed is:
1. A waste compactor configured to compact waste into a plurality of compacted waste units for disposal in a waste container, comprising:
 a compaction chamber for receiving waste to be compacted, including a first end and a second end, the first end having a first opening for interfacing with the waste container; the compaction chamber further including a second opening for inserting waste to be compacted;
 a closure assembly configured to seal the first opening during a compaction mode;
 a ram assembly disposed within the compaction chamber and actuatable from a retracted position proximate the second end of the compaction chamber to an extended position proximate the first end;

an actuator interconnected to the ram assembly configured, during the compaction mode, to apply a force to the ram assembly to move the ram assembly from the retracted position toward the extended position to achieve a pressure on a compaction surface of the ram assembly as it compacts the waste against the closure assembly;

a plurality of apertures in at least one internal surface proximate the first end of the compaction chamber; wherein liquid and residual solid waste exit the compaction chamber through the apertures during the compaction mode; and a collection system configured to collect the liquid and residual solid waste from the plurality of apertures; wherein the collection system includes a filter unit configured to filter the liquid and retain residual solid waste; the filter unit having a first end and a second end, the second end including an opening in communication with the compaction chamber; wherein the collection system further includes an evaporation system to evaporate at least a portion of the liquid filtered by the filter unit.

2. The waste compactor of claim 1, wherein the collection system includes a collection chamber, configured to receive the liquid and residual solid waste from the plurality of apertures; the collection system further includes a first line for transporting the liquid and residual solid waste from the collection chamber to the filter unit.

3. The waste compactor of claim 2, wherein the collection system further includes a pump to transport the liquid and residual solid waste from the collection chamber to the filter unit.

4. The waste compactor of claim 2, wherein the collection chamber further includes at least one nozzle, configured to spray the internal surfaces of the collection chamber in a cleaning mode.

5. The waste compactor of claim 1, wherein the filter unit includes a filter, positioned between the first end and the second end of the filter unit, through which the liquid passes, the residual solid waste remaining on a surface of the filter.

6. The waste compactor of claim 5, wherein the filter unit further includes a scraper device configured to travel in an extension mode from the first end to the second end across the surface of the filter to remove the residual solid waste from the filter and force the residual solid waste out of the opening of the second end and into the compaction chamber and to travel in a retraction mode from the second end to the first end.

7. The waste compactor of claim 6, wherein the filter unit includes a first actuator interconnected to the scraper device and configured to extend the scraper device in the extension mode from a retracted position proximate the first end to an extended position to cause the scraper device to remove the residual solid waste from the filter and force it out of the opening of the filter unit and configured to retract the scraper device in the retraction mode from the extended position proximate the second end to the retracted position.

8. The waste compactor of claim 7, wherein the filter unit further includes a pair of guide members each having a top and a bottom surface, the guide members being disposed on opposite sides of the surface of the filter and extending from proximate the first end to proximate the second end of the filter unit; the scraper device traveling under the bottom surfaces of the guide members as the scraper device moves from the retracted position to the extended position in the extension mode to maintain contact between the scraper device and the filter and the scraper device being in contact with the top surfaces of the guide members as the scraper device moves from the extended position to the retracted position in the retraction mode to maintain separation between the scraper device and the filter.

9. The waste compactor of claim 8, wherein the filter unit further includes a second actuator configured to move the scraper device away from the surface of the filter and position the scraper device on the top surfaces of the guide members as the scraper device moves from the extended to the retracted position in the retraction mode to maintain separation between the scraper device and the surface of the filter.

10. The waste compactor of claim 8, wherein the bottom surfaces of the guide members are positioned a distance less than or equal to a height of the scraper device from the surface of the filter to provide a downward force from the scraper device on the surface of the filter as the scraper device travels in an extension mode from the first end to the second end across the filter.

11. The waste compactor of claim 1, wherein the plurality of apertures have a width ranging from ¼ inch to ⅟₃₂ inch.

12. The waste compactor of claim 5, wherein the filter comprises a filter material having a plurality of openings with a width ranging from 0.01 inch to 0.05 inch.

13. The waste compactor of claim 12, wherein the filter further comprises a perforated plate to support the filter material.

14. The waste compactor of claim 1, wherein the closure assembly includes a gate having two vertical sides, the gate moveable in a vertical direction to alternatively open to expose the first opening and close to seal the first opening; wherein the closure assembly further includes two vertical channels in which the two vertical sides of the gate travel as the gate is opened and closed, the closure assembly further includes a filling member affixed to the bottom of each vertical side of the gate, each filling member configured to fill its respective vertical channel as the gate is opened.

15. The waste compactor of claim 14, wherein the collection chamber further includes an aperture aligned with each of the filling members to receive the filling members as they travel into the collection chamber as the gate is closed.

16. The waste compactor of claim 15, wherein collection chamber includes angled sidewalls and the filling members are hinged so as to conform to the angled sidewalls as the filling members travel into the collection chamber as the gate is closed.

17. The waste compactor of claim 14, wherein the filling members are made of a polymer.

18. The waste compactor of claim 1, wherein the collection system further comprises a liquid collection vessel, in communication with the filter unit, the liquid collection vessel configured to receive the liquid from the filter unit.

19. The waste compactor of claim 18, including a second line for transporting the liquid between the liquid collection vessel and the evaporation system and a first filtration system disposed in the second line to remove particles from the liquid.

20. The waste compactor of claim 19, further including a pump to transport the liquid from the collection chamber to the evaporation system.

21. The waste compactor of claim 19, wherein the size of the particles removed by the first filtration system range from 0.5 to 5 microns.

22. The waste compactor of claim 19, further including a second filtration system disposed in the second line to remove hydrocarbons and odor from the liquid, wherein the second filtration system comprises activated carbon.

* * * * *